(12) United States Patent
Nishida et al.

(10) Patent No.: US 8,502,773 B2
(45) Date of Patent: Aug. 6, 2013

(54) INFORMATION PROCESSING APPARATUS AND COMPUTER-READABLE RECORDING MEDIUM RECORDING INFORMATION PROCESSING PROGRAM

(75) Inventors: Kenichi Nishida, Kyoto (JP); Tsubasa Sakaguchi, Kyoto (JP)

(73) Assignee: Nintendo Co., Ltd., Koyto (JP)

(*) Notice: Subject to any disclaimer, the term of this patent is extended or adjusted under 35 U.S.C. 154(b) by 793 days.

(21) Appl. No.: 12/352,696

(22) Filed: Jan. 13, 2009

(65) Prior Publication Data
US 2010/0097309 A1     Apr. 22, 2010

(30) Foreign Application Priority Data

Oct. 16, 2008  (JP) ................................. 2008-267823

(51) Int. Cl.
G06F 3/033     (2006.01)
(52) U.S. Cl.
USPC ............................ 345/157; 345/156; 345/160
(58) Field of Classification Search
None
See application file for complete search history.

(56) References Cited

U.S. PATENT DOCUMENTS

| | | | |
|---|---|---|---|
| 7,958,455 B2* | 6/2011 | Doar | 715/784 |
| 2005/0190144 A1 | 9/2005 | Kong | |
| 2006/0250358 A1* | 11/2006 | Wroblewski | 345/157 |
| 2007/0060228 A1 | 3/2007 | Akasaka et al. | |
| 2007/0176896 A1* | 8/2007 | Gritton et al. | 345/157 |
| 2008/0012827 A1* | 1/2008 | Ryu et al. | 345/158 |
| 2008/0174551 A1* | 7/2008 | Ishibashi | 345/158 |
| 2009/0113354 A1* | 4/2009 | Yun et al. | 715/863 |

FOREIGN PATENT DOCUMENTS

| | | |
|---|---|---|
| JP | 6-208435 | 7/1994 |
| JP | 2005-243021 | 5/2005 |
| JP | 2007-61489 | 3/2007 |

OTHER PUBLICATIONS

Japanese Office Action issued for corresponding Japanese Patent Application No. 2008-267823, dated May 23, 2012.

* cited by examiner

*Primary Examiner* — Lixi C Simpson
(74) *Attorney, Agent, or Firm* — Nixon & Vanderhye P.C.

(57) ABSTRACT

Motion information is obtained which is information about a motion applied to an input device housing itself including a pointing device of a plurality of input mean. Next, based on the motion information, a movement amount of the input device housing is calculated. Thereafter, it is determined whether or not the movement amount satisfies predetermined conditions. When the predetermined conditions are satisfied, a position is designated based on an output from the pointing device.

30 Claims, 17 Drawing Sheets

F I G. 1
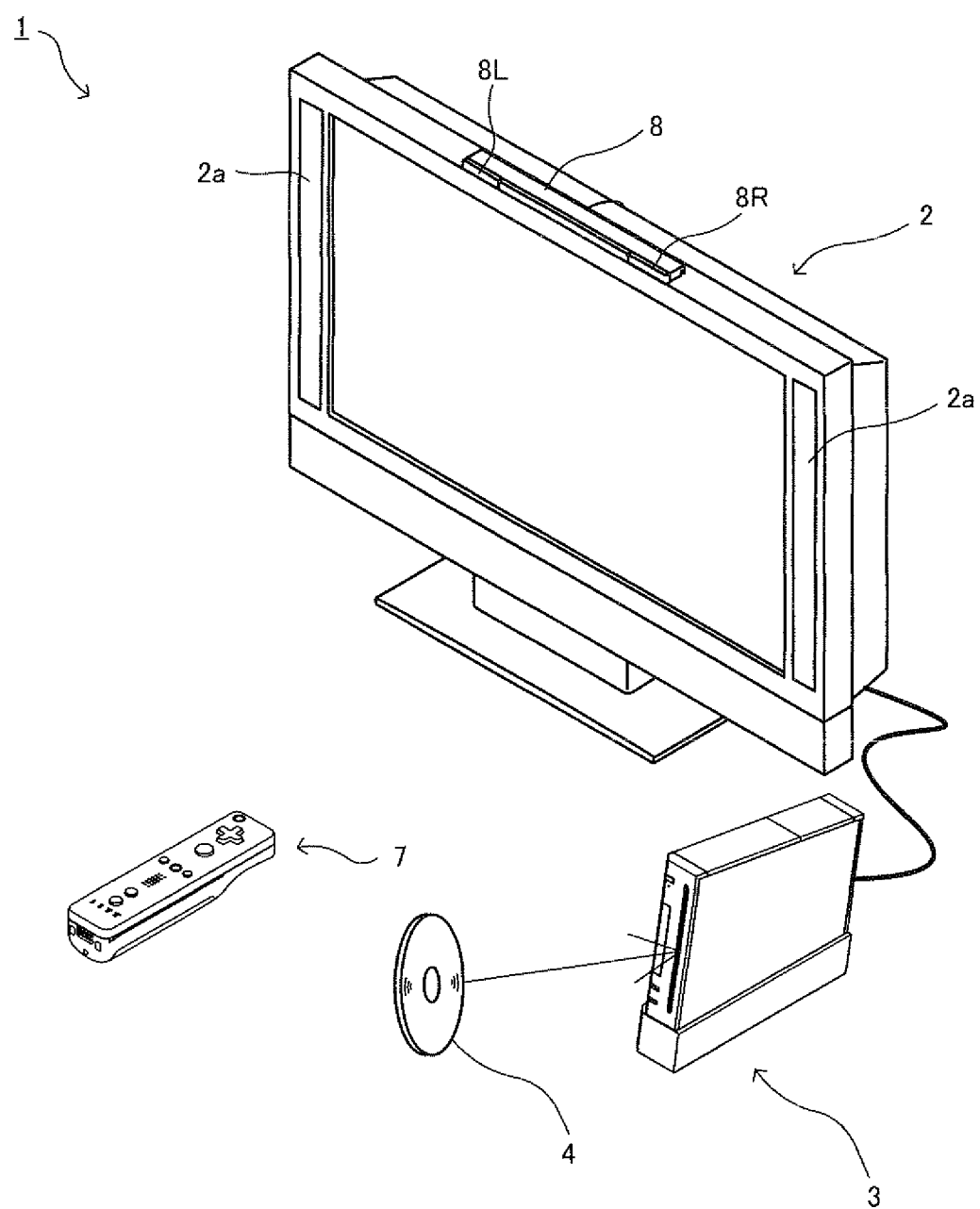

F I G. 3
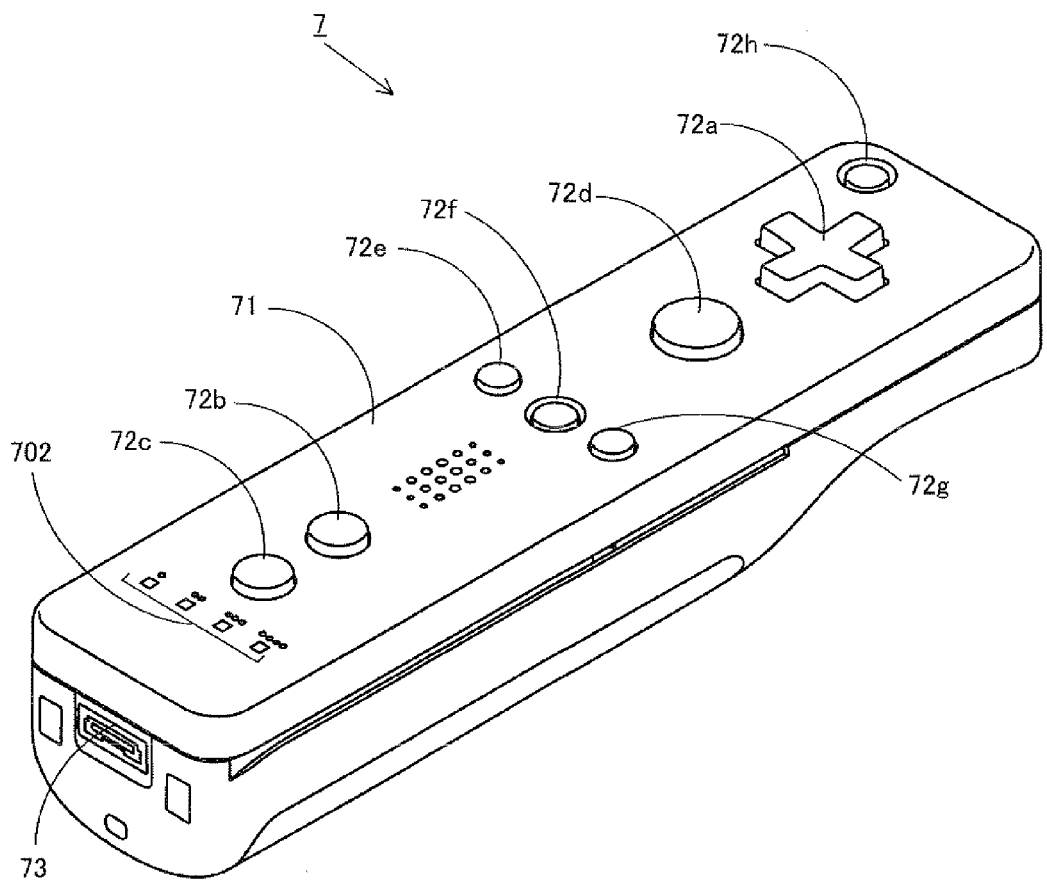

F I G. 5
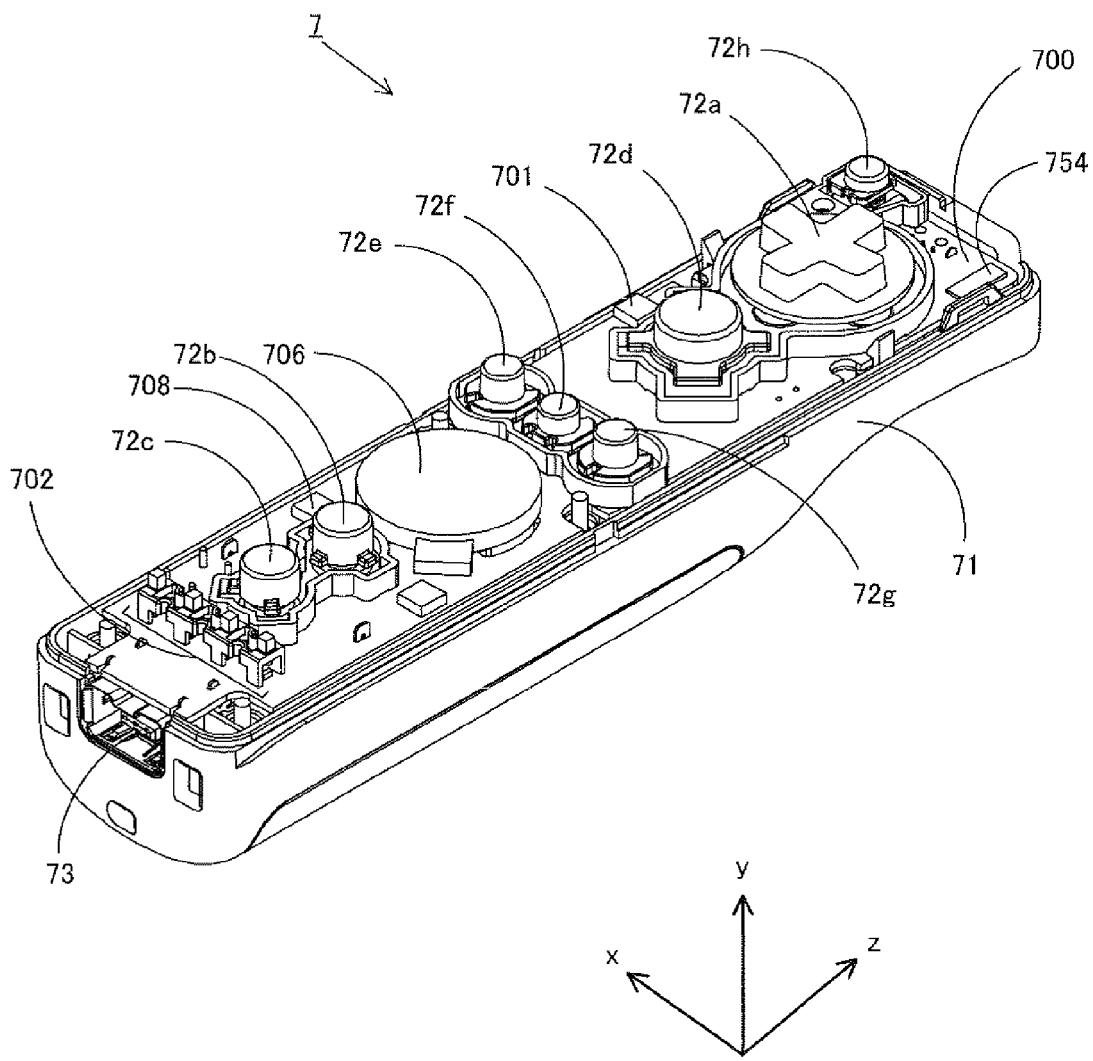

INFORMATION PROCESSING APPARATUS AND COMPUTER-READABLE RECORDING MEDIUM RECORDING INFORMATION PROCESSING PROGRAM

CROSS REFERENCE TO RELATED APPLICATION

The disclosure of Japanese Patent Application No. 2008-267823, filed Oct. 16, 2008, is incorporated herein by reference.

BACKGROUND OF THE INVENTION

1. Field of the Invention

The present invention relates to an information processing apparatus and a computer-readable recording medium recording an information processing program which are used to designate a position on a screen and execute a selection process. More particularly, the present invention relates to an information processing apparatus and a computer-readable recording medium recording an information processing program which are used to designate a position on a screen and execute a selection process based on outputs of a plurality of input means including at least a pointing device.

2. Description of the Background Art

Conventionally, in a computer system and the like, a coordinate input apparatus has been used so as to designate process items (e.g., a menu). Among its application forms, a plurality of coordinate input apparatuses, such as a mouse and a tablet, may be connected to a system and used in combination as appropriate. When such an application form is employed, a plurality of coordinate input apparatuses need to be switched as required. An apparatus for switching these coordinate input apparatuses is known (e.g., Japanese Patent Laid-Open Publication No. H06-208435). In the coordinate input apparatus switching apparatus, a coordinate input apparatus is selected in which changes in designated coordinate continually occur for a predetermined period of time or more. Specifically, one of the mouse and the tablet is selected only when it has been operated for a predetermined period of time.

However, the aforementioned apparatus for switching coordinate input apparatuses has the following problem when it switches the coordinate input apparatuses. Specifically, the switching apparatus selects a coordinate input apparatus to be used, based on whether or not the coordinate input apparatus has been operated for a predetermined period of time or more as described above. Therefore, disadvantageously, it takes a relatively long time to switch coordinate input apparatuses. In other words, the response to switching is slow. Therefore, coordinate input apparatuses cannot be switched in quick response at a timing desired by the user.

SUMMARY OF THE INVENTION

Therefore, an object of the present invention is to provide an information processing apparatus and a computer-readable recording medium recording an information processing program that can switch a plurality of input means in quick response.

The present invention has the following features to attain the object mentioned above. Note that reference numerals, additional descriptions and the like inside parentheses in this section indicate correspondence to embodiments described below for the sake of easy understanding, and do not limit the present invention.

A first aspect of the present invention is directed to a computer-readable recording medium recording an information processing program executable by a computer of an information processing apparatus for designating a position on a screen based on outputs of a plurality of input means including at least one pointing device, the program causing the computer to function as: an motion information obtaining means (S47), a movement amount calculating means (S48), a threshold determining means (S52), and a first position designating means (S54, S24). The motion information obtaining means obtains motion information that is information about a motion applied to a first input device housing itself including the pointing device. The movement amount calculating means calculates a movement amount of the first input device housing based on the motion information. The threshold determining means determines whether or not the movement amount exceeds a predetermined threshold. The first position designating means designates a position based or an output from the pointing device when the threshold determining means determines that the movement amount exceeds the predetermined threshold.

According to the first aspect, when a motion applied to an input device itself including a pointing device is detected, and based on the motion, then the operation can be switched to a position designating operation that is performed using the pointing device. Thereby, when a plurality of input means are used to perform an operation, it is possible to switch the input means used by the player in quick response.

In a second aspect based on the first aspect, the first input device housing further includes a non-pointing device that is an input means that is not a pointing device, of the plurality of input means. The information processing program causes the computer to further function as a determination means (S23) and a second position designating means (S25, S26). The determination means determines whether or not an input to the non-pointing device has occurred when position designation is being performed by the first position designating means. The second position designating means designates a position based on an output from the non-pointing device when the determination means determines that an input to the non-pointing device has occurred.

According to the second aspect, when input devices including a pointing device and a non-pointing device are used in the same housing, operation methods of the devices can be switched in quick response.

In a third aspect based on the first aspect, a non-pointing device that is an input means that is not a pointing device, of the plurality of input means, is included in a second input device housing, and the information processing program causes the computer to further function as a determination means (S23) and a second position designating means (S25, S26). The determination means determines whether or not an input to the non-pointing device has occurred when position designation is being performed by the first position designating means. The second position designating means designates a position based on an output from the non-pointing device when the determination means determines that an input to the non-pointing device has occurred.

According to the third aspect, when a pointing device and a non-pointing device are provided in separate housings, input methods employing the devices can be switched in quick response.

In a fourth aspect based on the first aspect, the information processing program causes the computer to further function as a switching means (S27, S54) for switching a position designation mode between a first position designation mode in which position destination is performed using the first position designating means and a second position designation mode in which position designation is performed based on an output from a non-pointing device that is an input means that is not a pointing device. The switching means switches the position designation mode to the first position designation mode if the movement amount exceeds a predetermined threshold when the position designation mode is the second position designation mode, and switches the position designation mode to the second position designation mode if an input to the non-pointing device has occurred when the position designation mode is the first position designation mode.

According to the fourth aspect, a method of operating a pointing device for position designation and a method of operating a non-pointing device for position designation can be switched in quick response, depending on a motion applied to the input device housing itself.

In a fifth aspect based on the fourth aspect, the information processing program causes the computer to further function as a no-input period measuring means (S46, S53) for measuring a period of time during which it is determined that there is not an input to the non-pointing device when the position designation mode is the second position designation mode. The switching means switches the position designation mode to the first position designation mode when the period of time measured by the no-input period measuring means exceeds a predetermined value.

According to the fifth aspect, the operability of an input device can be improved, thereby enhancing the convenience for the user.

In a sixth aspect based on the first aspect, the first input device housing includes a motion sensor for detecting a motion applied to the first input device housing itself. The motion information obtaining means obtains data output from the motion sensor as the motion information.

According to the sixth aspect, a motion applied to the first input device housing itself can be more accurately recognized, thereby making it possible to achieve switching operation methods more accurately and in quick response.

In a seventh aspect based on the first aspect, the motion information obtaining means repeatedly obtains data indicating a position designated by the pointing device, as the motion information. The movement amount calculating means calculates the movement amount based on a change amount of the designated positions of the pointing device.

According to the seventh aspect, the change amount of the designated positions of the pointing device is used to determine whether or not an operation method employing the pointing device is to be used. Thereby, it is possible to more accurately sense a motion applied to the input device housing itself.

In an eighth aspect based on the first aspect, the information processing program causes the computer to further function as an accumulation means (S49) for accumulating the movement amounts calculated by the movement amount calculating means. The threshold determining means determines whether or not the cumulative value of the accumulation means exceeds a predetermined threshold.

According to the eighth aspect, a timing at which the user desires to switch the operation methods can be more accurately determined.

In a ninth aspect based on the eighth aspect, the accumulation means accumulates the movement amounts For a predetermined period of time until a current time.

According to the ninth aspect, when a small motion is continually applied to the first input device housing for a long time, it is possible to prevent from erroneously switching to the first position designating means.

In a tenth aspect based on the eighth aspect, the information processing program causes the computer to further function as a cumulative value resetting means (S28) for resetting the cumulative value when an input has occurred with respect to an input means other than the pointing device.

According to the tenth aspect, the operation methods can be more accurately switched.

In an eleventh aspect based on the first aspect, the information processing program causes the computer to further function as a movement change amount calculating means (S48) for calculating a change amount of the movement amounts calculated by the movement amount calculating means. The threshold determining means determines whether or not the change amount calculated by the movement change amount calculating means exceeds a predetermined threshold.

In a twelfth aspect based on the eleventh aspect, the information processing program causes the computer to further function as a change amount accumulating means (S49) for accumulating the change amounts calculated by the movement change amount calculating means. The threshold determining means determines whether or not the cumulative change amount of the change amount accumulating means exceeds a predetermined threshold.

According to the eleventh and twelfth aspects, a motion applied to an input device housing can be detected based on a change amount of movements, thereby making is possible to more accurately detect a movement amount.

In a thirteenth aspect of the twelfth aspect, the change amount accumulating means accumulates the change amounts for a predetermined period of time until a current time.

According to the thirteenth aspect, when a small motion is continually applied to the first input device housing for a long time, it is possible to prevent from erroneously switching to the first position designating means.

In a fourteenth aspect based on the twelfth aspect, the information processing program causes the computer to further function as a cumulative value resetting means (S28) for resetting the cumulative change amount when an input has occurred with respect to an input means other than the pointing device.

According to the fourteenth aspect, the operation methods can be more accurately switched.

In a fifteenth aspect based on the first aspect, the first input device housing includes an image capturing means for capturing an image of at least one object whose image to be captured and which is located in a vicinity of a display device. The first position designating means includes a captured image data obtaining means (S21). The captured image data obtaining means obtains captured image data output from the first input device housing including the image capturing means. The first position designating means designates a position based on an object whose image to be captured is shown in a captured image indicated by the captured image data.

According to the fifteenth aspect, when a pointing device is used which is operated while an input device is directed toward a display device, the operation methods can be switched with further improved operability and in quick response.

A sixteenth aspect of the present invention is directed to a computer-readable recording medium recording an information processing program executable by a computer of an information processing apparatus for selecting one of a plurality of objects displayed on a screen, the program causing the computer to function as an motion information obtaining means (S47) and a selection mode switching means (S23, S27, S52 to S54). The motion information obtaining means obtains motion information that is information about a motion applied to a predetermined input device housing itself used for an operation of selecting the objects. The selection mode switching means switches a selection mode based on the motion information, between a pointing selection mode and a key selection mode, the pointing selection mode being a selection mode in which any position on the screen can be designated, and any of the objects displayed on the screen can be selected by designating a position where the object is displayed, and the key selection mode being a selection mode in which setting of a focused state indicating a selected state is changed among the objects displayed on the screen in a predetermined order, depending on a predetermined key input.

According to the sixteenth aspect, a method employing a pointing technique and a method without it are switched based on a motion applied to an input device housing itself, thereby making it possible to achieve a switching operation with quiker response.

In a seventeenth aspect based on the sixteenth aspect, the information processing program causes the computer to further function as a first determination means (S23) and a movement amount calculating means (S48). The first determination means determines whether or not the predetermined key input has been performed when the selection mode is the pointing selection mode. The movement amount calculating means calculates a movement amount of the input device itself based on the motion information when the selection mode is the key selection mode. The selection mode switching means switches the selection mode to the key selection mode when the first determination means determines that the key input has been performed, and switches the selection mode to the pointing selection mode when the movement amount calculated by the movement amount calculating means exceeds a predetermined threshold.

According to the seventeenth aspect, the selection methods can be switched using an operation natural to the user.

In an eighteenth aspect based on the sixteenth aspect, the input device housing includes a motion sensor for detecting a motion applied to the input device housing itself. The motion information obtaining means obtains data output from the motion sensor as the motion information.

According to the eighteenth aspect, a motion applied to an input device itself can be more accurately sensed.

In a nineteenth aspect based on the sixteenth aspect, the information processing program causes the computer to further function as an accumulation means (S49) for accumulating the movement amounts calculated by the movement change amount calculating means. The selection mode switching means switches the selection mode to the pointing selection mode when the cumulative value of the accumulation means exceeds a predetermined threshold.

According to the nineteenth aspect, a timing at which the user desires to switch the operation methods can be more accurately determined.

In a twentieth aspect based on the nineteenth aspect, the accumulation means accumulates the movement amounts for a predetermined period of time until a current time.

According to the twentieth aspect, when a small motion is continually applied to an input device housing for a long time, it is possible to prevent from erroneously switching the selection modes.

In a twenty-first aspect based on the nineteenth aspect, the information processing program causes the computer to further function as a cumulative value resetting means (S28) for resetting the cumulative value when the first determination means determines that the predetermined key input has been performed.

According to the twenty-first aspect, the operation methods can be more accurately switched.

In a twenty-second aspect based on the sixteenth aspect, the information processing program causes the computer to further function as a movement change amount calculating means for calculating a change amount of the movement amounts calculated by the movement amount calculating means. The selection mode switching means switches the selection mode to the pointing selection mode when the change amount calculated by the movement change amount calculating means exceeds a predetermined threshold.

In a twenty-third aspect based on the twenty-second aspect, the information processing program causes the computer to further function as a change amount accumulating means for accumulating the change amounts calculated by the movement change amount calculating means. The selection mode switching means switches the selection mode to the pointing selection mode when the cumulative change amount of the change amount accumulating means exceeds a predetermined threshold.

According to the twenty-second and twenty-third aspects, a motion applied to an input device housing can be detected based on a movement change amount, thereby making it possible to more accurately determine a movement amount.

In a twenty-fourth aspect based on the twenty-third aspect, the change amount accumulating means accumulates the change amounts for a predetermined period of time until a current time.

According to the twenty-fourth aspect, when a small motion is continually applied to an input device housing for a long time, it is possible to prevent from erroneously switching the selection modes.

In a twenty-fifth aspect based on the twenty-third aspect, the information processing program causes the computer to further function as a cumulative value resetting means for resetting the cumulative change amount when an input has occurred with respect to an input means other than the pointing device.

According to the twenty-fifth aspect, the operation methods can be more accurately switched.

In a twenty-sixth aspect based on the seventeenth aspect, the information processing program causes the computer to further function as a no-input period measuring means (S46, S53) for measuring a period of time during which it is determined that the key input is not being performed when the selection mode is the key selection mode. The selection mode switching means switches the selection mode to the pointing selection mode when the period of time measured by the no-input period measuring means exceeds a predetermined value.

According to the twenty-sixth aspect, the convenience for the user can be further improved.

A twenty-seventh aspect of the present invention is directed to an information processing apparatus for designating a position on a screen based on outputs of a plurality of input means including at least one pointing device, including an motion information obtaining means (10), a movement amount calculating means (10), a threshold determining means (10), and a first position designating means (10). The motion information obtaining means obtains motion information that is information about a motion applied to a first input device housing itself including the pointing device. The movement amount calculating means calculates a movement amount of the first input device housing based on the motion information. The threshold determining means determines whether or not the movement amount exceeds a predetermined threshold. The first position designating means designates a position based on an output from the pointing device when the threshold determining means determines that the movement amount exceeds the predetermined threshold.

According to the twenty-seventh aspect, an effect similar to that of the first aspect is obtained.

A twenty-eighth aspect of the present invention is directed to an information processing apparatus for selecting one of a plurality of objects displayed on a screen, including an motion information obtaining means (10) and a selection mode switching means (10). The motion information obtaining means obtains motion information that is information about a motion applied to a predetermined input device housing itself used for an operation of selecting the objects. The selection mode switching means switches a selection mode based on the motion information, between a pointing selection mode and a key selection mode, the pointing selection mode being a selection mode in which any position on the screen can be designated, and any of the objects displayed on the screen can be selected by designating a position where the object is displayed, and the key selection mode being a selection mode in which setting of a focused state indicating a selected state is changed among the objects displayed on the screen in a predetermined order, depending on a predetermined key input.

According to the twenty-eighth aspect, an effect similar to that of the sixteenth aspect can be obtained.

According to the present invention, a plurality of position designating methods employing a pointing device can be switched in quick response, thereby making it possible to improve operability and convenience for the player.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an external view of a game system 1 according to an embodiment of the present invention;

FIG. 3 is a perspective view showing a controller 7 of FIG. 1 as viewed from the top and the rear;

FIG. 5 is a perspective view of the controller 7 of FIG. 3 where an upper housing thereof is cut away;

DESCRIPTION OF THE PREFERRED EMBODIMENTS

Figure 2:
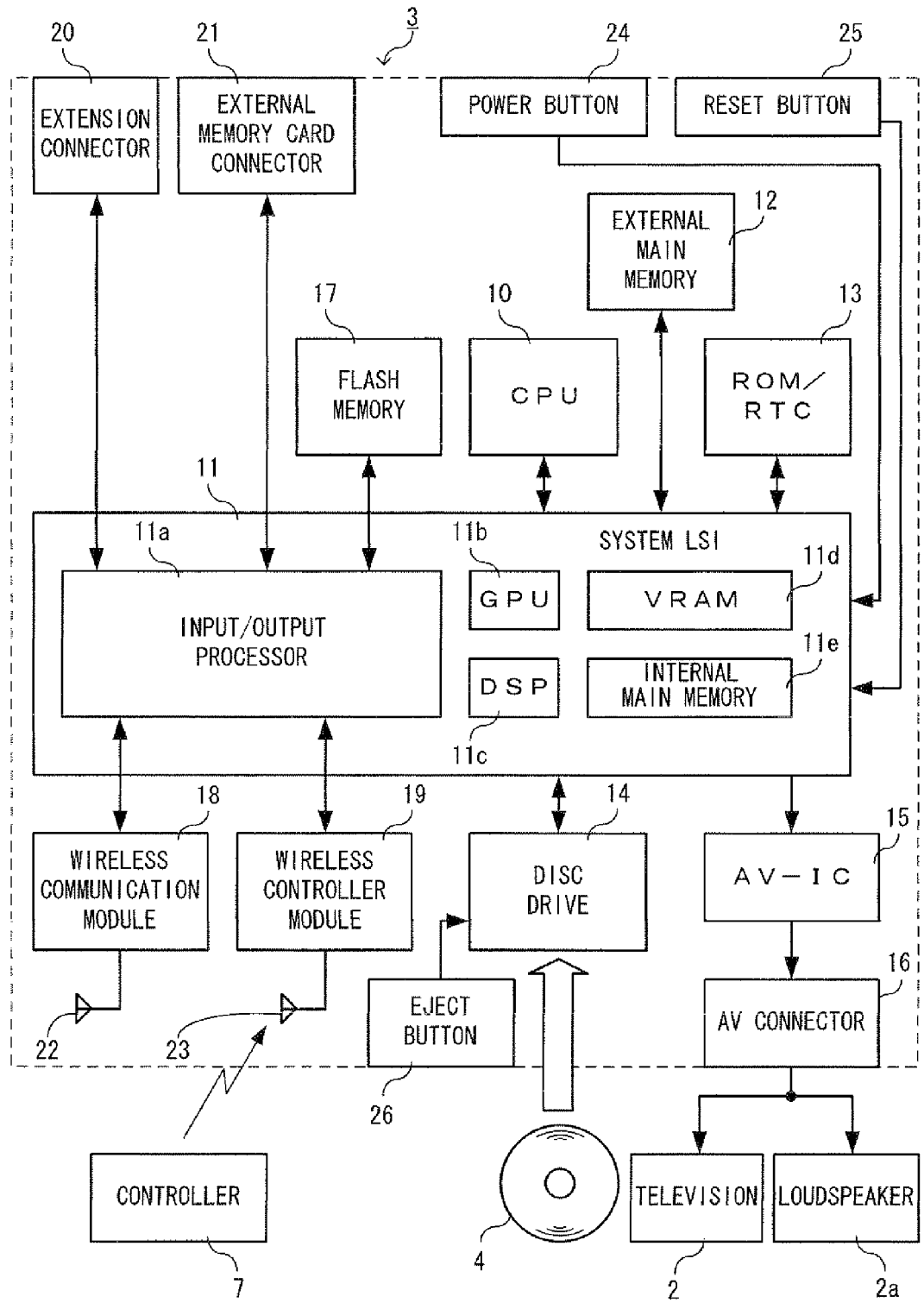
FIG. 2 is a functional block diagram of a game apparatus main body 3.

Hereinafter, embodiments of the present invention will be described with reference to the accompanying drawings. Note that the present invention is not limited to these examples.

(Whole Configuration of Game System)

A game system 1 including a game apparatus according to an embodiment of the present invention will be described with reference to FIG. 1. FIG. 1 is an external view of the game system 1. Hereinafter, the game apparatus of this embodiment and a game program will be described, where the game apparatus is a stationary game apparatus as an example. In FIG. 1, the game system 1 includes a television set (hereinafter simply referred to as a "television") 2, the game apparatus main body 3, an optical disc 4, a controller 7, and a marker unit 8. In the game system 1, the game apparatus main body 3 executes a game process based on a game operation using the controller 7.

The optical disc 4, which is an exemplary information storing medium changeable with respect to the game apparatus main body 3, is detachably loaded into the game apparatus main body 3. A game program that is executed in the game apparatus main body 3 is stored on the optical disc 4. On a front surface of the game apparatus main body 3, a slot through which the optical disc 4 is inserted is provided. The game apparatus main body 3 executes a game process by reading and executing the game program stored on the optical disc 4 which has been inserted into the slot.

The television 2 as an exemplary display device is connected via a connection cord to the game apparatus main body 3. The television 2 displays a game image that is obtained as a result of the game process executed in the game apparatus main body 3. The maker unit 8 is provided in the vicinity of the screen of the television 2 (on an upper side of the screen in FIG. 1). The maker unit 8 comprises two markers 8R and 8L at both ends thereof. Specifically, the marker 8R is one or more infrared LEDs that output infrared light toward the front of the television 2 (the same is true of the marker 8L). The maker unit 8 is connected to the game apparatus main body 3, so that the game apparatus main body 3 can control ON/OFF of each infrared LED included in the maker unit 8.

The controller 7 is an input device which inputs operation data indicating an operation performed with respect to the controller 7, to the game apparatus main body 3. The controller 7 and the game apparatus main body 3 are connected via wireless communication. In this embodiment, for example, the Bluetooth(R) technology is used for wireless communication between the controller 7 and the game apparatus main body 3. Note that, in another embodiment, the controller 7 and the game apparatus main body 3 may be connected via wired communication.

(Internal Configuration of Game Apparatus Main Body 3)

Next, an internal configuration of the game apparatus main body 3 will be described with reference to FIG. 2. FIG. 2 is a block diagram showing the configuration of the game apparatus main body 3. The game apparatus main body 3 has a CPU 10, a system LSI 11, an external main memory 12, a ROM/RTC 13, a disc drive 14, an AV-IC 15, and the like.

The CPU 10 executes a game program stored on the optical disc 4 to perform a game process, i.e., functions as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processes, such as controlling data transfer between each part connected thereto, generating an image to be displayed, obtaining data from an external apparatus, and the like. An internal configuration of the system LSI 11 will be described below. The volatile external main memory 12 stores a program, such as a game program read out from the optical disc 4, a game program read out from a flash memory 17, or the like, or various kinds of data, and is used as a work area or a buffer area for the CPU 10. The ROM/RTC 13 has a ROM (so-called boot ROM) which stores a program for booting the game apparatus main body 3, and a clock circuit (RTC: Real Time Clock) which counts time. The disc drive 14 reads out program data, texture data or the like from the optical disc 4, and writes the read data into an internal main memory 11e (described below) or the external main memory 12.

The system LSI 11 also includes an input/output processor 11a, a GPU (Graphics Processor Unit) 11b, a DSP (Digital Signal Processor) 11c, a VRAM 11d, and the internal main memory 11e. The parts 11a to 11e are connected with each other via an internal bus (not shown).

The GPU 11b, which is a part of a drawing means, generates an image in accordance with a graphics command (image drawing command) from the CPU 10. More specifically, the GPU 11b performs a calculation process required to display 3D graphics, such as coordinate conversion from 3D coordinates to 2D coordinates (preprocess before rendering) or the like, and a final rendering process, such as attaching texture or the like, in accordance with the graphics command, to generate game image data. Here, the CPU 10 inputs, to the GPU 11b, an image generating program required to generate game image data in addition to the graphics command. The VRAM 11d stores data (e.g., polygon data, texture data, etc.) which is required by the GPU 11b to execute the graphics command. When an image is generated, the GPU 11b generates image data using data stored in the VRAM 11d.

The DSP 11c, which functions as an audio processor, generates audio data using sound data or sound waveform (tone color) data stored in the internal main memory 11e or the external main memory 12. The internal main memory 11e also stores a program or various data as with the external main memory 12, i.e., is also used as a work area or a buffer area for the CPU 10.

The image data and audio data thus generated are read out by the AV-IC 15. The AV-IC 15 outputs the read image data via an AV connector 16 to the television 2, and the read audio data to a loudspeaker 2a included in the television 2. Thereby, an image is displayed on the television 2 while a sound is output from the loudspeaker 2a.

The input/output processor (I/O processor) 11a executes data transmission and reception between parts connected thereto, or downloads data from an external apparatus. The input/output processor 11a is connected to the flash memory 17, a wireless communications module 18, a wireless controller module 19, an extension connector 20, and an external memory card connector 21. An antenna 22 is connected to the wireless communications module 18, and an antenna 23 is connected to the wireless controller module 19.

The input/output processor 11a is connected via the wireless communications module 18 and the antenna 22 to a network, and can communicate with other game apparatuses or various servers connected to the network. The input/output processor 11a regularly accesses the flash memory 17 to detect the presence or absence of data that needs to be transmitted to the network. In the case of the presence of the data, the input/output processor 11a transmits the data via the wireless communications module 18 and the antenna 22 to the network. The input/output processor 11a also receives data transmitted from other game apparatuses or data downloaded from a download server via the network, the antenna 22, and the wireless communications module 18, and stores the received data into the flash memory 17. The CPU 10 executes a game program to read out the data stored in the flash memory 17 and utilizes the data in the game program. In addition to data communicated between the game apparatus main body 3 and other game apparatuses or various servers, save data (result data or intermediate data of a game) of a game played using the game apparatus main body 3 may be stored into the flash memory 17.

The input/output processor 11a also receives, via the antenna 23 and the wireless controller module 19, operation data transmitted from the controller 7, and stores (temporarily stores) the operation data into a buffer area of the internal main memory 11e or the external main memory 12.

Also, the extension connector 20 and the external memory card connector 21 are connected to the input/output processor 11a. The extension connector 20 is a connector for interface, such as USB or SCSI. When a medium (e.g., an external storage medium, etc.), a peripheral device (e.g., another controller, etc.), or a wired communications connector is connected to the extension connector 20, communication with a network can be performed without using the wireless communications module 18. The external memory card connector 21 is a connector for connecting an external storage medium, such as a memory card or the like. For example, the input/output processor 11a can access an external storage medium via the extension connector 20 or the external memory card connector 21 to save data or read out data.

The game apparatus main body 3 is provided with a power button 24, a reset button 25, and an eject button 26. The power button 24 and the reset button 25 are connected to the system LSI 11. When the power button 24 is turned ON, power is supplied via an AC adaptor (not shown) to each part of the game apparatus main body 3. Also, if the power button 24 is pressed again while the power supply is ON, the game apparatus main body 3 is transitioned to a low-power standby mode. Even in this state, the game apparatus main body 3 is energized, so that the game apparatus main body 3 can always be connected to a network, such as the Internet or the like. Note that the power supply which is currently ON can be turned OFF by pressing the power button 24 for a predetermined time or more. When the reset button 25 is pressed, the system LSI 11 reboots the boot program of the game apparatus main body 3. The eject button 26 is connected to the disc drive 14. When the eject button 26 is pressed, the optical disc 4 is ejected from the disc drive 14.

Figure 4:
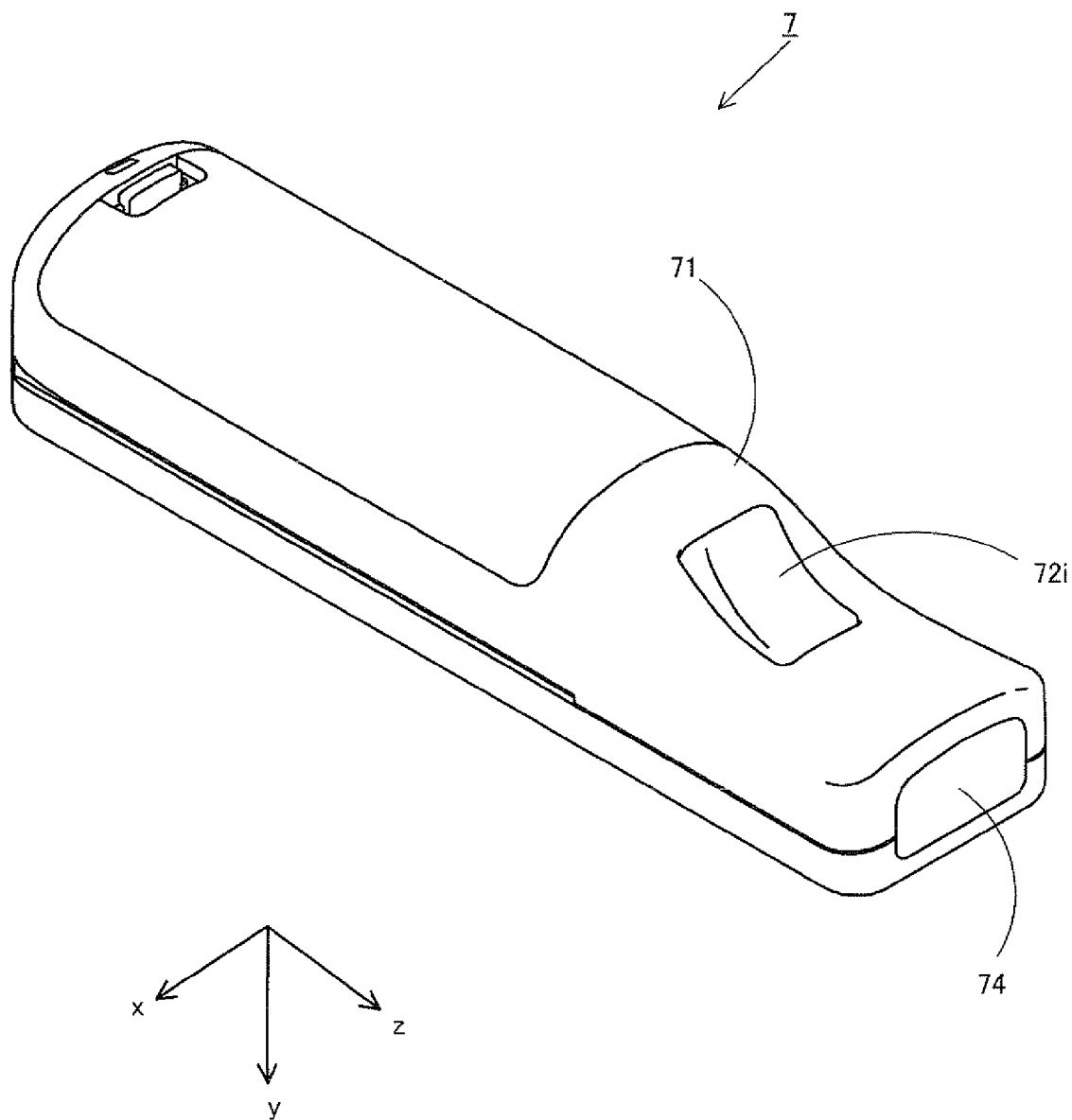
FIG. 4 is a perspective view showing the controller 7 of FIG. 3 as viewed from the bottom and the front.

Next, the controller 7 will be described with reference to FIGS. 3 and 4. FIG. 3 is a perspective view of the controller 7 as viewed from the top and the rear. FIG. 4 is a perspective view of the controller 7 as viewed from the bottom and the front.

In FIGS. 3 and 4, the controller 7 has a housing 71, and an operation section 72 comprising a plurality of operation buttons provided on a surface of the housing 71. The housing 71 of this example is in the shape of substantially a rectangular parallelepiped where a front-to-rear direction thereof is a longitudinal direction thereof. The whole housing 71 has a size which allows an adult and a child to hold the controller 7 with one hand. The housing 71 is formed by, for example, plastic molding.

A cross key 72a is provided on a central portion closer to a front surface of an upper surface of the housing 71. The cross key 72a is a four-direction push switch in the shape of a cross, and has operation portions corresponding to the respective four directions (frontward, rearward, leftward, and rightward), the operation portions being provided at the respective projecting pieces of the cross which are arranged at intervals of 90°. Any one of the frontward, rearward, leftward and rightward directions is selected by a player pushing down a corresponding one of the operation portions of the cross key 72a. For example, by a player operating the cross key 72a, a movement direction of a player character or the like appearing in a virtual game world can be designated, or one can be selected and designated from a plurality of options.

Note that the cross key 72a is an operation section which outputs an operation signal, depending on the aforementioned direction input operation by a player, or may be an operation section of other embodiments. For example, an operation section may be provided in which four push switches are disposed in cross directions, and an operation signal is output, depending on a push switch pushed down by the player. In addition to the four push switches, a center switch may be provided at an intersection position of the cross directions, i.e., a complex operation section comprising the four push switches and the center switch may be provided. Also, instead of the cross key 72a, an operation section may be provided which outputs an operation signal, depending on a tilt direction of a tiltable stick (so-called joystick) which projects from the upper surface of the housing 71. Also, instead of the cross key 72a, an operation section may be provided which outputs an operation signal, depending on a slide direction of an disc-like member which can be moved in a horizontal direction. Also, a touch pad may be provided instead of the cross key 72a.

A plurality of operation buttons 72b to 72g are provided at the rear of the cross key 72a on the upper surface of the housing 71. The operation buttons 72b to 72g are operation sections which output operation signals assigned to the respective operation buttons 72b to 72g when a player pushes down the head portions of the respective buttons. For example, functions of a 1st button, a 2nd button, an A button, and the like are assigned to the operation buttons 72b to 72d. Functions of a minus switch, a home switch, a plus button, and the like are assigned to the operation buttons 72e to 72g. The operation buttons 72a to 72g are assigned the respective functions, depending on a game program executed by the game apparatus main body 3. Note that, in the exemplary arrangement of FIG. 3, the operation buttons 72b to 72d are aligned on a central portion in a front-to-rear direction of the upper surface of the housing 71. The operation buttons 72e to 72g are aligned in a lateral direction on the upper surface of the housing 71 and between the operation buttons 72b and 72d. The operation button 72f is a button of a type whose upper surface is buried below the upper surface of the housing 71 so that the player is prevented from unintentionally and erroneously pushing down the button.

Also, an operation button 72h is provided at the front of the cross key 72a on the upper surface of the housing 71. The operation button 72h is a power supply switch which remotely switches ON/OFF a power supply for the game apparatus main body 3. The operation button 72h is also a button of the type whose upper surface is buried below the upper surface of the housing 71 so that a player is prevented from unintentionally and erroneously pushing down the button.

A plurality of LEDs 702 are provided at the rear of the operation button 72c on the upper surface of the housing 71. Here, the controller 7 is assigned controller identification (number) so as to distinguish it from other controllers 7. For example, the LEDs 702 are used so as to notify a player of controller identification currently set for the controller 7. Specifically, when transmission data is transmitted from the controller 7 to the game apparatus main body 3, one of the LEDs 702 is turned ON, depending on the controller identification.

Also, sound holes through which sound is emitted from a loudspeaker (a loudspeaker 706 of FIG. 5) described below to the outside are formed between the operation button 72b and the operation buttons 72e to 72g on the upper surface of the housing 71.

On the other hand, a hollow portion is formed on a lower surface of the housing 71. The hollow portion on the lower surface of the housing 71 is formed at a position where the index finger or the middle finger of a player is placed when the player holds the controller 7 with one hand while directing the front surface of the controller 7 toward the markers 8L and 8R. An operation button 72i is provided on a slope surface of the hollow portion. The operation button 72i is an operation section which functions as, for example, a B button.

An image capturing device 743 which is a part of the image capture information computing section 74 is provided on a front surface of the housing 71. Here, the image capture information computing section 74 is a system for analyzing image data captured by the controller 7 to determine a place having a high luminance in the image data and detect a center-of-gravity position, a size or the like of the place. The image capture information computing section 74 has, for example, a maximum sampling cycle of about 200 frames/sec, and therefore, can track and analyze relatively high-speed movement of the controller 7. A detailed structure of the image capture information computing section 74 will be described below. A connector 73 is provided on a rear surface of the housing 71. The connector 73 is, for example, an edge connector which is utilized so as to engage and connect the controller 7 with a connection cable.

Here, in order to specifically describe the present invention, a coordinate system which is set with respect to the controller 7 is defined as follows. As illustrated in FIGS. 3 and 4, X, Y and Z axes, which are orthogonal to each other, are defined with respect to the controller 7. Specifically, a front-to-rear direction of the controller 7 (the longitudinal direction of the housing 71) is assumed to be the Z axis, and a Front surface (a surface on which the image capture information computing section 74 is provided) direction of the controller 7 is assumed to be the positive direction of the Z axis. A vertical direction of the controller 7 is assumed to be the Y axis, and a lower surface (a surface on which the operation button 72i is provided) direction of the housing 71 is assumed to be the positive direction of the Y axis. A lateral direction of the controller 7 is assumed to be the X axis, and a left side surface (a side surface illustrated in FIG. 4, but not in FIG. 3) direction of the housing 71 is assumed to be the positive direction of the X axis.

Figure 6:
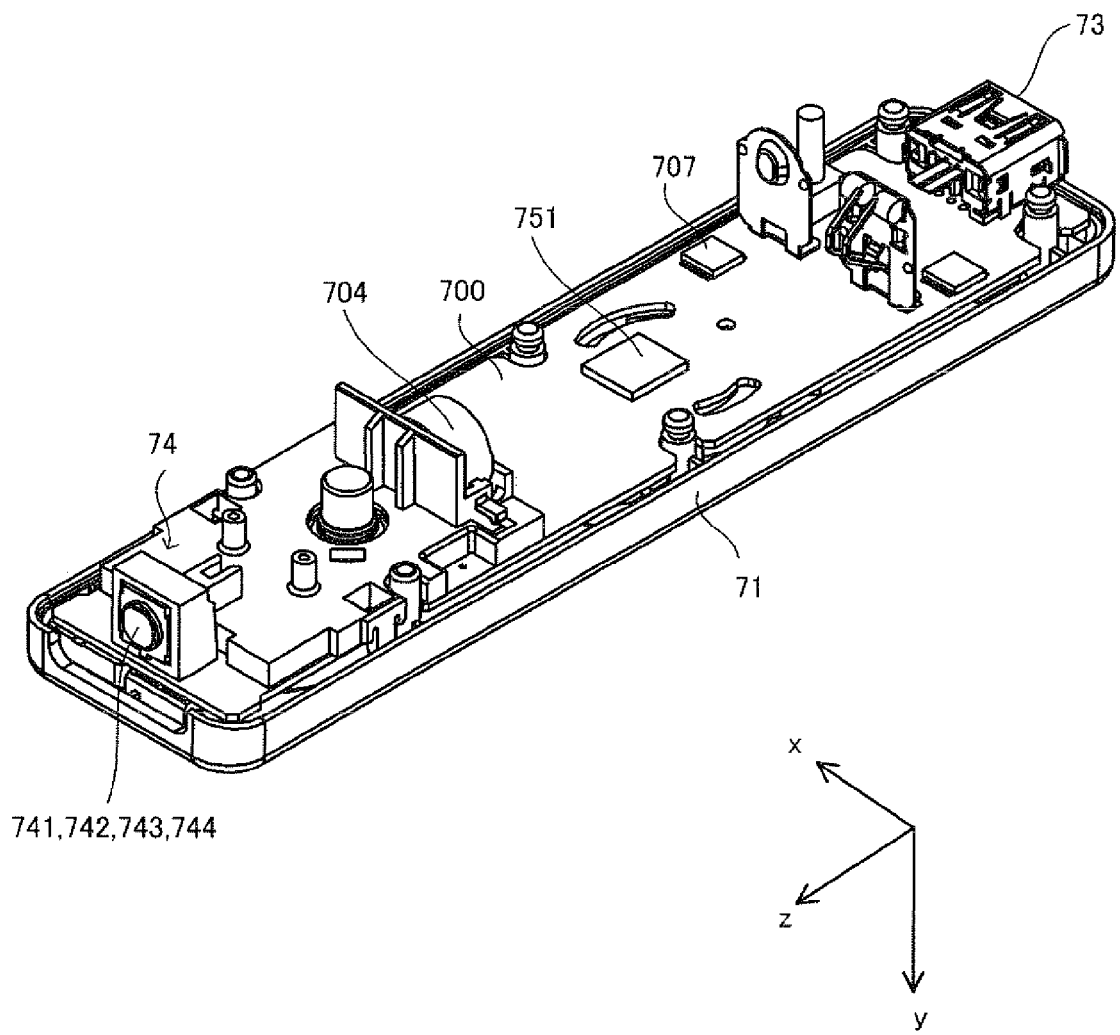
FIG. 6 is a perspective view of the controller 7 of FIG. 3 where a lower housing thereof is cut away.

Next, an internal structure of the controller 7 will be described with reference to FIGS. 5 and 6. Note that FIG. 5 is a perspective view of the controller 7 (as viewed from a rear surface side thereof) where an upper housing (a portion of the housing 71) is cut away. FIG. 6 is a perspective view of the controller 7 as viewed from the front surface side thereof where a lower housing (a portion of the housing 71) is cut away. FIG. 6 illustrates a perspective view of a base board 700 of FIG. 5 as viewed from a bottom surface thereof.

In FIG. 5, the base board 700 is fixed inside the housing 71. On an upper major surface of the base board 700, the operation buttons 72a to 72h, an acceleration sensor 701, the LEDs 702, an antenna 754, and the like are provided. These are connected to a microcomputer 751 (see FIGS. 6 and 7) via conductors (not shown) formed on the base board 700 and the like. The microcomputer 751 functions to generate operation button data, depending on the operation button 72a or the like, as an exemplary button data generating means of the present invention. This mechanism, which is a known technique, is implemented, for example, by the microcomputer 751 detecting contact/disconnection of a conductor by a switching mechanism, such as a tactile switch or the like, which is provided under a key top. More specifically, for example, when an operation button is pushed down to contact a conductor, a current flows. The microcomputer 751 detects the current flow to determine which operation button has been pushed down, and generates a signal, depending on the operation button.

Also, by a radio module 753 (see FIG. 7) and an antenna 754, the controller 7 functions as a wireless controller. Note that a quartz oscillator (not shown) is provided in the housing 71, and generates a basic clock for the microcomputer 751 (described below). Also, the loudspeaker 706 and an amplifier 708 are provided on the upper major surface of the base board 700. Also, the acceleration sensor 701 is provided on a left side of the operation button 72d on the base board 700 (i.e., a peripheral portion of the base board 700, but not a center portion thereof). Therefore, the acceleration sensor 701 can detect an acceleration including a component due to a centrifugal force as well as a change in direction of a gravitational acceleration, depending on a rotation of the controller 7 around the longitudinal direction as an axis. Therefore, by predetermined computation, the game apparatus main body 3 or the like can determine the rotation of the controller 7 based on the detected acceleration data with satisfactory sensitivity.

On the other hand, in FIG. 6, the image capture information computing section 74 is provided at a front edge on a lower major surface of the base board 700. The image capture information computing section 74 comprises an infrared filter 741, a lens 742, the image capturing device 743, and an image processing circuit 744, which are arranged in this order from the front of the controller 7, and are attached to the lower major surface of the base board 700. The connector 73 is attached to a rear edge on the lower major surface of the base board 700. Also, a sound IC 707 and the microcomputer 751 are provided on the lower major surface of the base board 700. The sound IC 707 is connected to the microcomputer 751 and the amplifier 708 via conductors formed on the base board 700 and the like, and outputs an audio signal via the amplifier 708 to the loudspeaker 706, depending on sound data transmitted from the game apparatus main body 3.

A vibrator 704 is attached onto the lower major surface of the base board 700. The vibrator 704 may be, for example, a vibration motor or a solenoid. The vibrator 704 is connected to the microcomputer 751 via a conductor formed on the base board 700 and the like, and its activation is switched ON/OFF, depending on vibration data transmitted from the game apparatus main body 3. The activation of the vibrator 704 generates vibration in the controller 7, so that the vibration is transferred to a player's hand holding the controller 7, thereby making it possible to achieve a so-called vibration-feature supporting game. Here, since the vibrator 704 is disposed somehow closer to the front of the housing 71, the housing 71 significantly vibrates while the player is holding the controller 7, so that the player easily feels vibration.

Next, an Internal configuration of the controller 7 will be described with reference to FIG. 7. Note that FIG. 7 is a block diagram illustrating the configuration of the controller 7.

Figure 7:
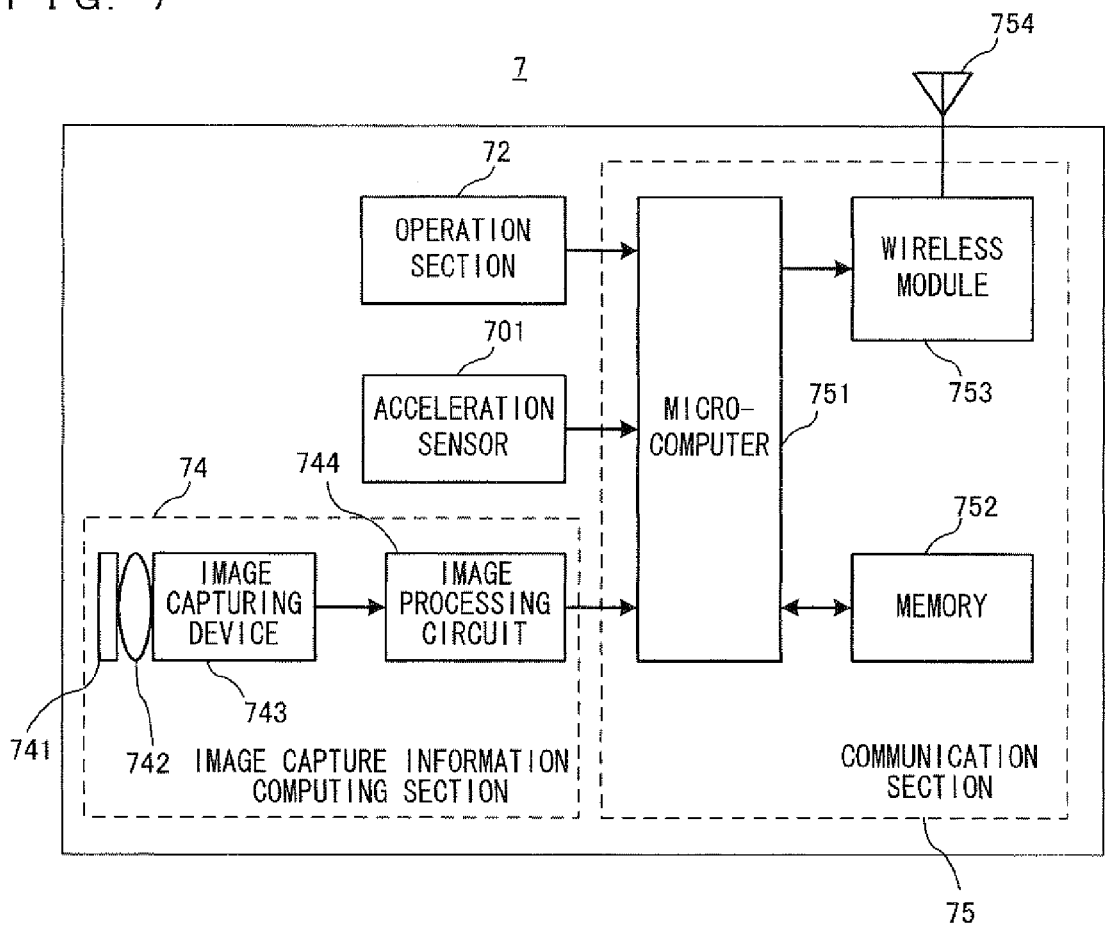
FIG. 7 is a block diagram showing a configuration of the controller 7 of FIG. 3.

In FIG. 7, the controller 7 comprises a communication section 75 in addition to the operation section 72, the image capture information computing section 74, the acceleration sensor 701, the vibrator 704, the loudspeaker 706, the sound IC 707, and the amplifier 708.

The image capture information computing section 74 includes the infrared filter 741, the lens 742, the image capturing device 743, and the image processing circuit 744. The infrared filter 741 passes only infrared light entering from the front of the controller 7. Here, the markers 8L and 8R which are provided in the vicinity of the display screen of the television 2 are infrared LEDs which emit infrared light toward the front of the television 2. Therefore, by providing the infrared filter 741, images of the markers 8L and 8R can be accurately captured. The lens 742 collects infrared light passing through the infrared filter 741 and causes the light to enter the image capturing device 743. The image capturing device 743 may be, for example, a solid-state image capturing device, such as a CMOS sensor or a CCD, and captures the infrared light collected by the lens 742. Therefore, the image capturing device 743 captures only infrared light passing through the infrared filter 741 to generate image data. An image captured by the image capturing device 743 is hereinafter referred to as a captured image. The image data generated by the image capturing device 743 is processed by the image processing circuit 744. The image processing circuit 744 calculates a position of an object whose image to be captured (the markers 8L and 8R) in the captured image. Hereinafter, a method of calculating the position of an object whose image to be captured will be described with reference to FIG. 8.

Figure 8:
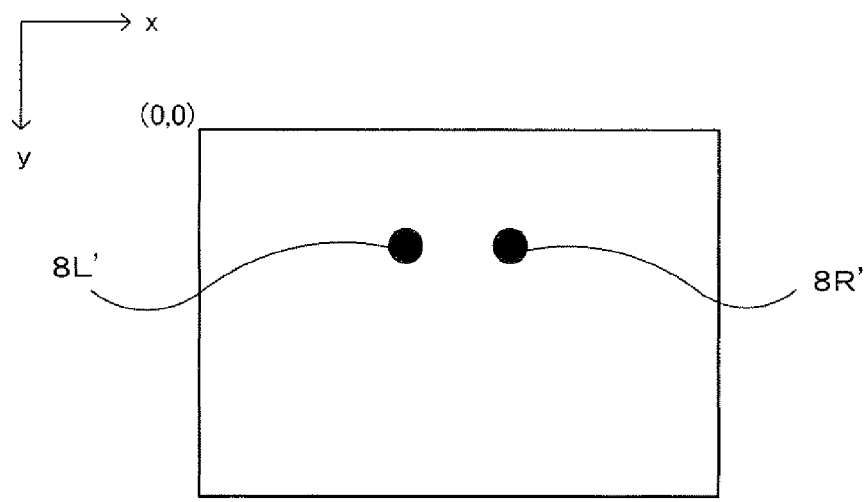
FIG. 8 is a diagram showing an exemplary captured image.

FIG. 8 is a diagram showing an exemplary captured image. In the captured image of FIG. 8, an image 8L' of the marker 8L and an image 8R' of the marker 8R are laterally arranged. When receiving the captured image, the image processing circuit 744 initially calculates the coordinates of a position of each region in the captured image that matches predetermined conditions. Here, the predetermined conditions are conditions for finding an image of an object to be captured (a target image). Specifically, the predetermined conditions are such that the region has a luminance higher than or equal to a predetermined value (a high luminance region) and a size within a predetermined range. Note that any predetermined conditions that can be used to Find an object whose image to be captured may be employed. In other embodiments, the predetermined conditions may relate to the color of an image.

When a position of a target image is calculated, the image processing circuit 744 initially finds the aforementioned high luminance regions as candidates for the target image, from the entire region of a captured image. This is because a target image appears as a high illuminance region in the image data of a captured image. Next, based on a size of the high luminance region thus found, the image processing circuit 744 determines whether or not the high luminance region is the target image. The captured image may contain an image caused by sunlight through a window or light of a fluorescent tube in a room in addition to the images (target images) 8L' and 8R' of the two markers 8L and 8R. In this case, such an image may appear as a high illuminance region in addition to the images of the markers 8L and 8R. The aforementioned determination process is for distinguishing the images of the markers 8L and 8R (target images) from other images to accurately find the target images. Specifically, in the determination process, it is determined whether or not a high luminance region thus found has a size within a predetermined range. When the high luminance region has a size within the predetermined range, the high luminance region is determined to be the target image. When the size of the high luminance region is not within the predetermined range, the high luminance region is determined to be an image other than the target image.

Further, for a high luminance region which is determined to represent the target image as a result of the determination process, the image processing circuit 744 calculates a position of the high luminance region. Specifically, a position of the center of gravity of the high luminance region is calculated. Note that the position of the center of gravity can be calculated with a scale finer than the resolution of the image capturing element 743. It is here assumed that an image captured by the image capturing element 743 has a resolution of 126×96, and the position of the center of gravity can be calculated with a scale of 1024×768. In this case, the coordinates of the position of the center of gravity is represented with integer values in the range of (0, 0) to (1024, 768). Note that the position of the captured image is assumed to be represented by a coordinate system (xy coordinate system) where the upper left corner of the captured image is the origin, the downward direction is the positive direction of the y axis, and the rightward direction is the positive direction of the x axis.

As described above, the image processing circuit 744 calculates coordinates indicating a position of each region which satisfies the predetermined conditions in the captured image. Note that the coordinates calculated by the image processing circuit 744 are referred to as marker coordinates. The marker coordinates are coordinates that indicate a position of an object whose image is to be captured in the coordinate system for representing a position on a plane corresponding to the captured image. The image processing circuit 744 outputs the marker coordinates to the microcomputer 751 of the communication section 75. The data of the marker coordinates is transmitted as operation data to the game apparatus main body 3 by the microcomputer 751. Since the marker coordinates vary depending on an orientation (attitude) or a position of the controller 7 itself, the game apparatus main body 3 can calculate the orientation or the position of the controller 7. Although the processes until marker coordinates are calculated from a captured image are carried out by the image processing circuit 744 and/or the microcomputer 751 of the controller 7 in this embodiment, the captured image may be transferred to the game apparatus main body 3 and processes similar to the subsequent processes may be executed by the CPU 10 or the like of the game apparatus main body 3.

The controller 7 preferably comprises the acceleration sensor 701 which senses accelerations along with three axes (x, y and z axes). The three-axis acceleration sensor 701 senses linear accelerations in three directions, i.e., a vertical direction, a lateral direction, and a front-to-rear direction. In another embodiment, the acceleration sensor 701 may be a two-axis acceleration detecting means which senses only linear accelerations along two axes in the vertical direction and the lateral direction (or other direction pairs), depending on the type of a control signal used in a game process. For example, the three- or two-axis acceleration sensors 701 may be of a type which is available from Analog Devices, Inc. or STMicroelectronics N.V. The acceleration sensor 701 may be of a capacitance type (capacitance coupling type) based on a technique of MEMS (Micro Electro Mechanical Systems) obtained by micromachining a silicon material However, the three- or two-axis acceleration sensor 701 may be implemented using a technique of an existing acceleration detecting means (e.g., a piezoelectric type or a piezoelectric resistance type) or other appropriate techniques which will be developed in the future.

It is known to those skilled in the art that an acceleration detecting means as used in the acceleration sensor 701 can sense only an acceleration (linear acceleration) along a straight line corresponding to each axis of the acceleration sensor 701. In other words, a direct output from the acceleration sensor 701 is a signal indicating a linear acceleration (static or dynamic) along each of the two or three axes. Therefore, the acceleration sensor 701 cannot directly sense physical characteristics, such as a motion along a non-linear path (e.g., an arc, etc.), a rotation, a rotational motion, an angular displacement, a tilt, a position, an attitude, and the like.

However, it can be easily understood by those skilled in the art from the description of the present specification that, by a computer, such as a processor (e.g., the CPU 10) of the game apparatus, a processor (e.g., the microcomputer 751) of the controller 7 or the like, executing a process based on a signal relating to an acceleration output from the acceleration sensor 701, additional information about the controller 7 can be estimated or calculated (determined). For example, a process may be performed by the computer, assuming that the controller 7 having the acceleration sensor 701 is in the static state (i.e., assuming that an acceleration detected by the acceleration sensor 701 is only a gravitational acceleration). In this case, if the controller 7 is actually in the static state, it can be determined based on the detected acceleration whether or not or how much the attitude of the controller 7 is tilted with respect to the gravity direction. Specifically, if a state of the acceleration sensor 701 whose detected axis is oriented vertically downward is assumed as a reference, it can be determined whether or not the controller 7 is tilted, based on whether or not 1 G (gravitational acceleration) is applied to the acceleration sensor 701, and it can be determined how much the controller is tilted, based on the magnitude of the acceleration detected by the acceleration sensor 701. Also, in the case of a multi-axis acceleration sensor, by subjecting an acceleration signal of each axis to a process, it can be determined in more detail how much the controller 7 is tilted with respect to the gravity direction. In this case, a processor may perform a process of calculating data about a tilt angle of the controller 7 based on the output of the acceleration sensor 701. Alternatively, a process of approximately estimating the tilt may be performed based on the output of the acceleration sensor 701 without performing the process of calculating the data about the tilt angle. Thus, by using a processor in combination with the acceleration sensor 701, a tilt, an attitude or a position of the controller 7 can be determined. On the other hand, when it is assumed that the acceleration sensor 701 is in the dynamic state, an acceleration depending on a motion of the acceleration sensor 701 is detected in addition to the gravitational acceleration component. Therefore, a motion direction or the like can be determined by removing the gravitational acceleration component by a predetermined process. Specifically, when the controller 7 comprising the acceleration sensor 701 is dynamically accelerated by a user's hand, various motions and/or positions of the controller 7 can be calculated by processing an acceleration signal generated by the acceleration sensor 701. Note that, even if it is assumed that the acceleration sensor 701 is in the dynamic state, a tilt with respect to the gravity direction can be determined by removing an acceleration depending on a motion of the acceleration sensor 701 by a predetermined process. In another example, the acceleration sensor 701 may comprise a built-in signal processing device or another type of dedicated processing device for performing a desired process with respect to an acceleration signal output from a built-in acceleration detecting means before outputting a signal to the microcomputer 751. For example, if the acceleration sensor 701 detects a static acceleration (e.g., the gravitational acceleration), the built-in or dedicated processing device may convert a sensed acceleration signal into a tilt angle corresponding thereto (or another preferable parameter).

In another embodiment, as an acceleration sensor for detecting a motion of the controller 7, a gyro-sensor comprising a rotation element, a vibration element, or the like may be employed. An exemplary MEMS gyro-sensor used in this embodiment is available from Analog Devices, Inc. As is different from the acceleration sensor 701, the gyro-sensor can directly sense a rotation (or an angular velocity) about an axis of at least one gyro-element included therein. Thus, since the gyro-sensor and the acceleration sensor are basically different from each other, one of them is selected, depending on the individual application, and processes performed for output signals from these devices need to be changed as appropriate.

Specifically, when a tilt or an attitude is calculated using a gyro-sensor instead of an acceleration sensor, a significant change is required. Specifically, when a gyro-sensor is used, the value of a tilt is initialized during the start of detection. Thereafter, angular acceleration data output from the gyro-sensor is integrated. Next, the amount of a change in tilt is calculated from the initialized tilt value. In this case, the calculated tilt has a value corresponding to an angle. On the other hand, when an acceleration sensor is used to calculate a tilt, the tilt is calculated by comparing the value of a component about each axis of a gravitational acceleration with a predetermined reference. Therefore, the calculated tilt can be represented by a vector, and an absolute direction can be detected by the acceleration detecting means without initialization. Also, whereas a value calculated as a tilt is an angle when a gyro-sensor is used, the value is a vector when an acceleration sensor is used. Therefore, when a gyro-sensor is used instead of an acceleration sensor, the tilt data needs to be subjected to predetermined conversion, taking into consideration a difference between the two devices. The characteristics of gyro-sensors as well as the basic difference between the acceleration detecting means and the gyro-sensor are known to those skilled in the art, and will not be herein described in more detail. Whereas gyro-sensors have an advantage of directly sensing rotation, acceleration sensors generally have an advantage over the gyro-sensor in terms of cost effectiveness when the acceleration sensor is applied to a controller as used in this embodiment.

The communication section 75 comprises the microcomputer 751, the memory 752, the radio module 753, and the antenna 754. The microcomputer 751 controls the radio module 753 for wirelessly transmitting transmission data while using the memory 752 as a memory area during a process. Also, the microcomputer 751 controls operations of the sound IC 707 and the vibrator 704, depending on data from the game apparatus main body 3 which is received by the radio module 753 via the antenna 754. The sound IC 707 processes sound data or the like transmitted from the game apparatus main body 3 via the communication section 75. Also, the microcomputer 751 activates the vibrator 704, depending on vibration data (e.g., a signal for switching ON/OFF the vibrator 704) or the like transmitted from the game apparatus main body 3 via the communication section 75.

An operation signal (key data) from the operation section 72 provided in the controller 7, acceleration signals (x-, y- and z-axis direction acceleration data; hereinafter simply referred to as acceleration data) from the acceleration sensor 701, and process result data from the image capture information computing section 74, are output to the microcomputer 751. The microcomputer 751 temporarily stores the received data (the key data, the acceleration data, and the process result data), as transmission data to be transmitted to the wireless controller module 19, into the memory 752. Here, radio transmission from the communication section 75 to the wireless controller module 19 is performed in predetermined cycles. Since a game is generally processed in units of 1/60 sec, the cycle of the radio transmission needs to be shorter than 1/60 sec. Specifically, the game processing unit is 16.7 ms (1/60 sec), and the transmission interval of the communication section 75 employing Bluetooth(R) is 5 ms. When timing of transmission to the wireless controller module 19 arrives, the microcomputer 751 outputs transmission data stored in the memory 752, as a series of pieces of operational information, to the radio module 753. Thereafter, the radio module 753 modulates the operational information using a carrier wave having a predetermined frequency and emits the resultant radio signal from the antenna 754, by means of, for example, the Bluetooth(R) technique. Specifically, the key data from the operation section 72 provided in the controller 7, the acceleration data from the acceleration sensor 701, and the process result data from the image capture information computing section 74 are modulated into a radio signal by the radio module 753, and the radio signal is transmitted from the controller 7. Thereafter, the wireless controller module 19 of the game apparatus main body 3 receives the radio signal, and the game apparatus main body 3 demodulates or decodes the radio signal, thereby obtaining a series of pieces of operational information (the key data, the acceleration data, and the process result data) Thereafter, the CPU 10 of the game apparatus main body 3 performs a game process based on the obtained operational information and a game program. Note that, when the communication section 75 is configured using the Bluetooth(R) technique, the communication section 75 can also have a function of receiving transmission data wirelessly transmitted from other devices.

Figure 9:
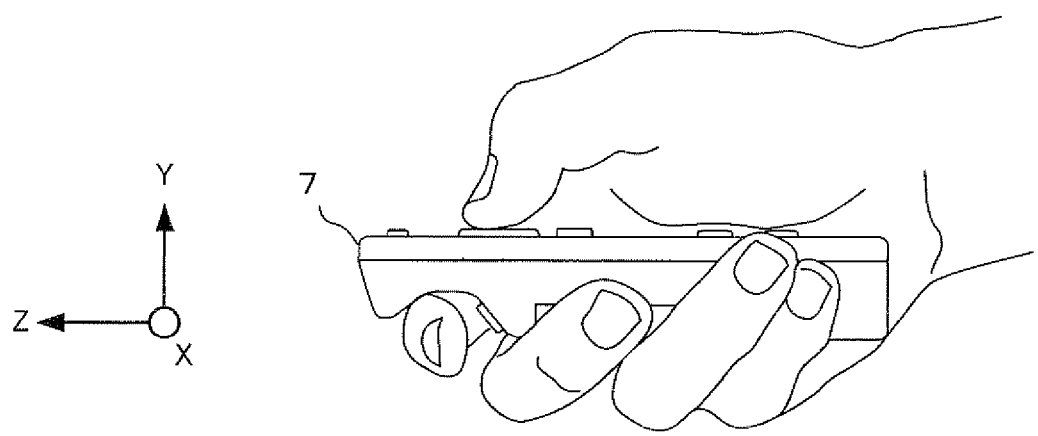
FIG. 9 is a diagram for describing a game operation using the controller 7.

Here, a game operation using the controller 7 will be described. When the controller 7 is used to play a game in the game system 1, a player holds the controller 7 with one hand. In this case, as shown in FIG. 9, the player holds the controller 7 while directing the front surface (a side through which light to be captured by the image capture information computing section 74 enters) of the controller 7 toward the markers 8L and 8R. In this state, the player performs a game operation by changing a tilt of the controller 7, a position (designated position) on the screen pointed or designated by the controller 7, or a distance between the controller 7 and each of the markers 8L and 8R.

Next, an outline of a process executed by the thus-configured game system 1 will be described. The present invention is generally applicable to any process of "selecting" an object or the like displayed on the screen. In this embodiment, as an example of such a process, a game in which a plurality of minigames are enjoyed is assumed. Of processes involved in the game, a process and an operation that are performed on a menu screen so as to select a minigame desired by the player will be described as an example.

Figure 10:
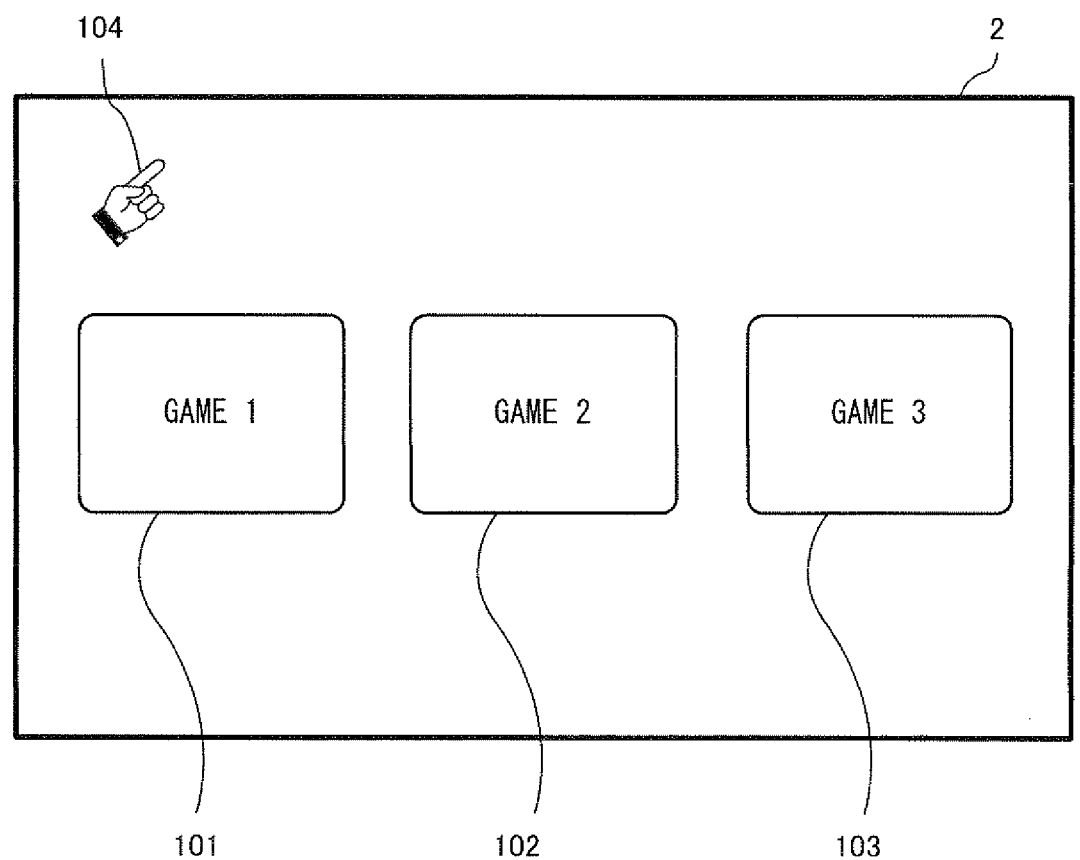
FIG. 10 is a diagram showing an exemplary game screen assumed in this embodiment.

FIG. 10 is a diagram showing an example of the menu screen. In FIG. 10, objects to be selected 101 to 103 and a pointer 104 are displayed. Each object represents a corresponding one of the minigames. The player selects any one of these objects 101 to 103 and presses down a predetermined determination button (e.g., the operation button 72b), thereby starting a play of the desired minigame. In principle, the pointer 104 is displayed at a position (designated position) on the screen pointed by the controller 7.

Next, selection operation modes (hereinafter simply referred to as operation modes) in this embodiment will be described. In this embodiment, two operation modes, i.e., a "pointing mode" and a "cross key mode", are employed. The pointing mode is an operation mode in which the pointer 104 is moved on the screen so as to select one of the objects. The cross key mode is an operation mode in which the cross key 72a is pressed down so as to select one of the objects.

Figure 11:
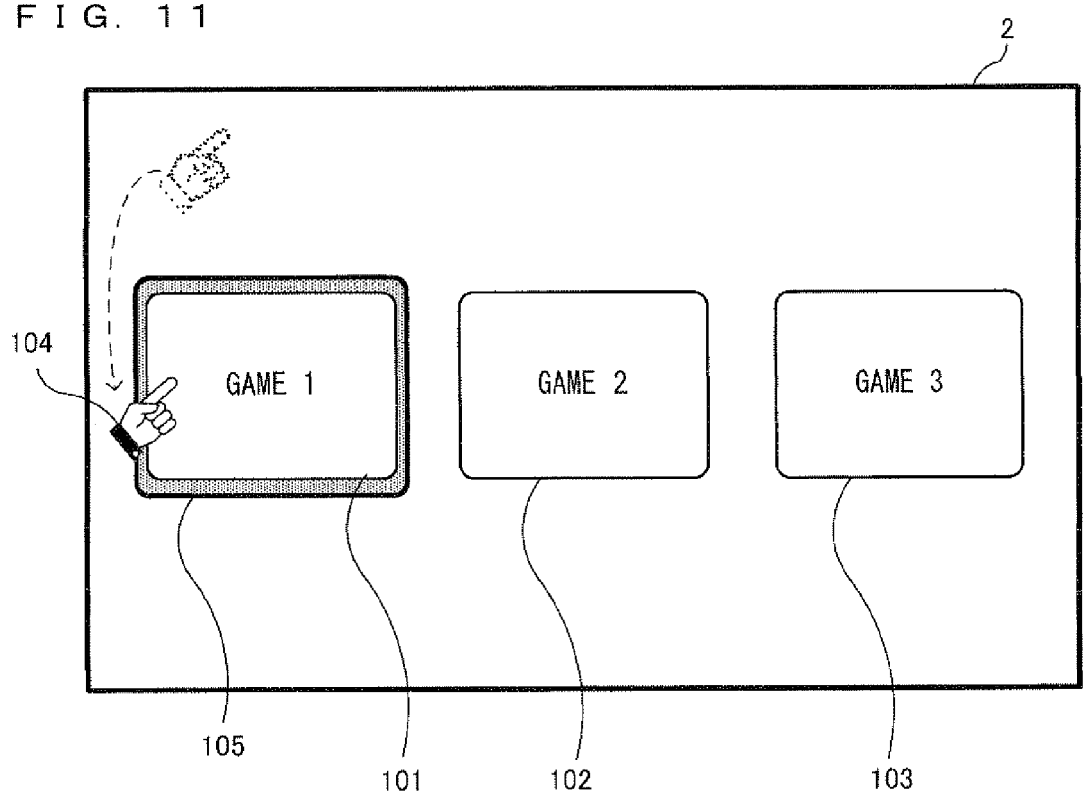
FIG. 11 is a diagram showing an exemplary game screen assumed in this embodiment.
Figure 12:
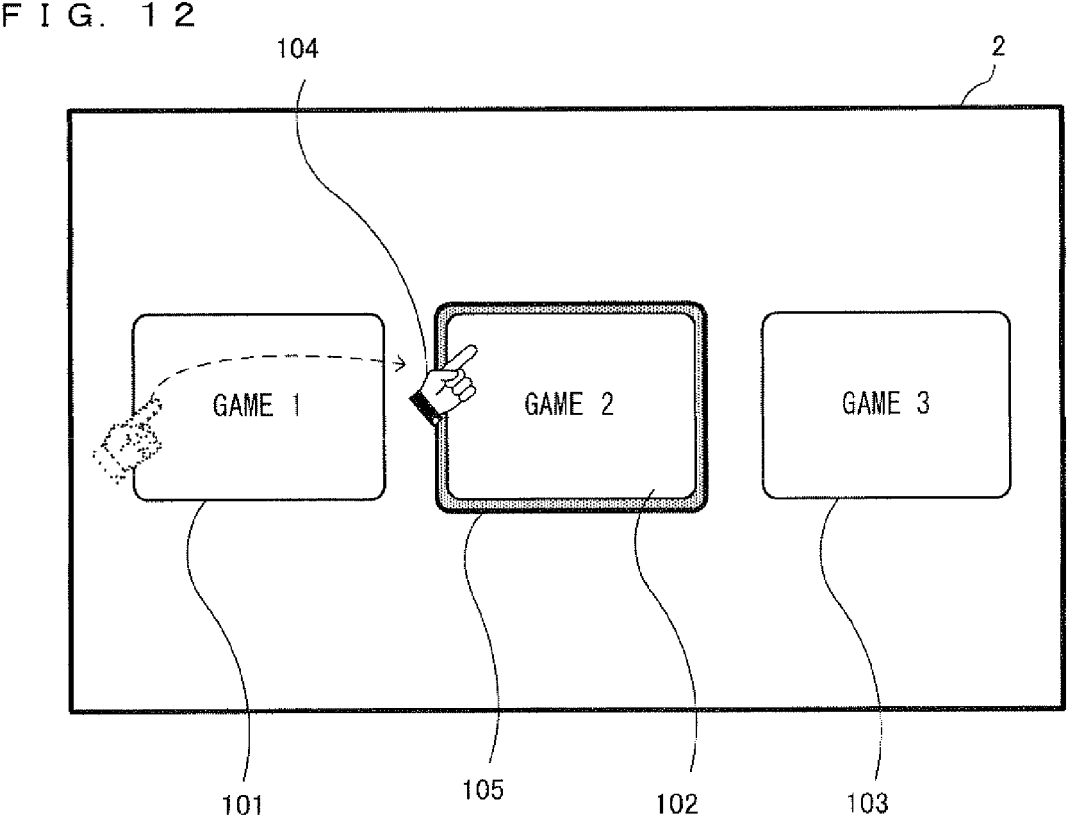
FIG. 12 is a diagram showing an exemplary game screen assumed in this embodiment.

An operation of performing selection in the pointing mode will be described with reference to FIGS. 10 to 15. Initially, as shown in FIG. 10, the pointer 104 is assumed to be in a state in which the pointer 104 is displayed in an upper left portion of the screen (a portion pointed by the controller 7). When from this state the pointer 104 (designated position) is moved to a position where the object 101 is displayed, a selection frame 105 is displayed which surrounds the object 101, and the object 101 is selected, as shown in FIG. 11. When from this state the pointer 104 is moved to a position where no object is displayed, the selected state is canceled (the selection frame 105 is not displayed). When from the state of FIG. 11 the pointer 104 is moved to a position where the object 102 is displayed, the selection frame 105 is displayed which surrounds the object 102, and the object 102 is selected, as shown in FIG. 12.

Next, an operation of performing selection in the cross key mode will be described. For example, when the "right" portion of the cross key 72a is pressed down by the player while the object 101 is selected as shown in FIG. 11, the object 102 displayed right-adjacent to the object 101 is then selected as shown in FIG. 12. In other words, with reference to a currently selected object, another object which is located in a direction of the cross key 72a that is pressed will be selected. Moreover, in this case, the displayed position of the pointer 104 is changed to a position that is located slightly left to and below a middle of the selected object 102.

Figure 14:
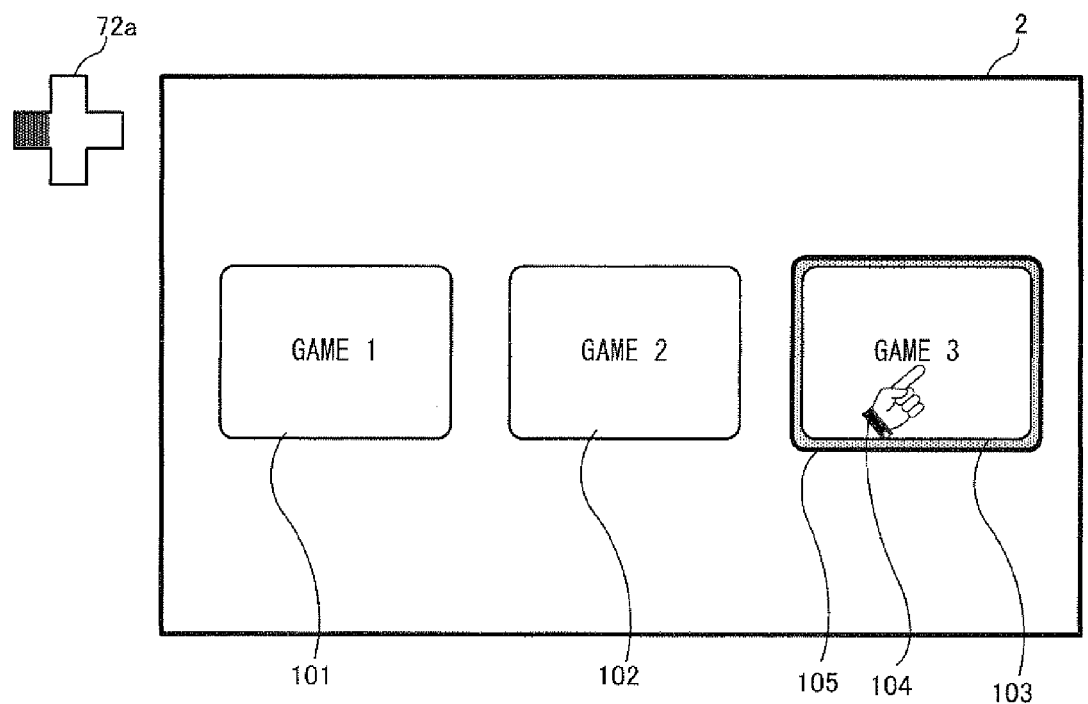
FIG. 14 is a diagram showing an exemplary game screen assumed in this embodiment.

When the "left" portion of the cross key 72a is pressed in the state of FIG. 11, then the rightmost object 103 is selected, and the pointer 104 is displayed at a position that is located slightly left to and below a middle of the selected object 103, as shown in FIG. 14. In other words, in this embodiment, when the "right" portion is pressed while the rightmost object 103 is selected, the leftmost object 101 is then selected, and when the "left" portion is pressed while the leftmost object 101 is selected, the rightmost object 103 is then selected.

Although not shown, when objects are vertically arranged, the objects can be similarly selected along the vertical direction by pressing the "top" and "bottom" portions of the cross key 72a.

Note that the aforementioned control of the order of selection in the cross key mode is only for illustrative purposes. For example, when the "right" portion is pressed while the rightmost object 103 is selected, the selected state may not be changed (i.e., the object 103 may remain selected).

Figure 13:
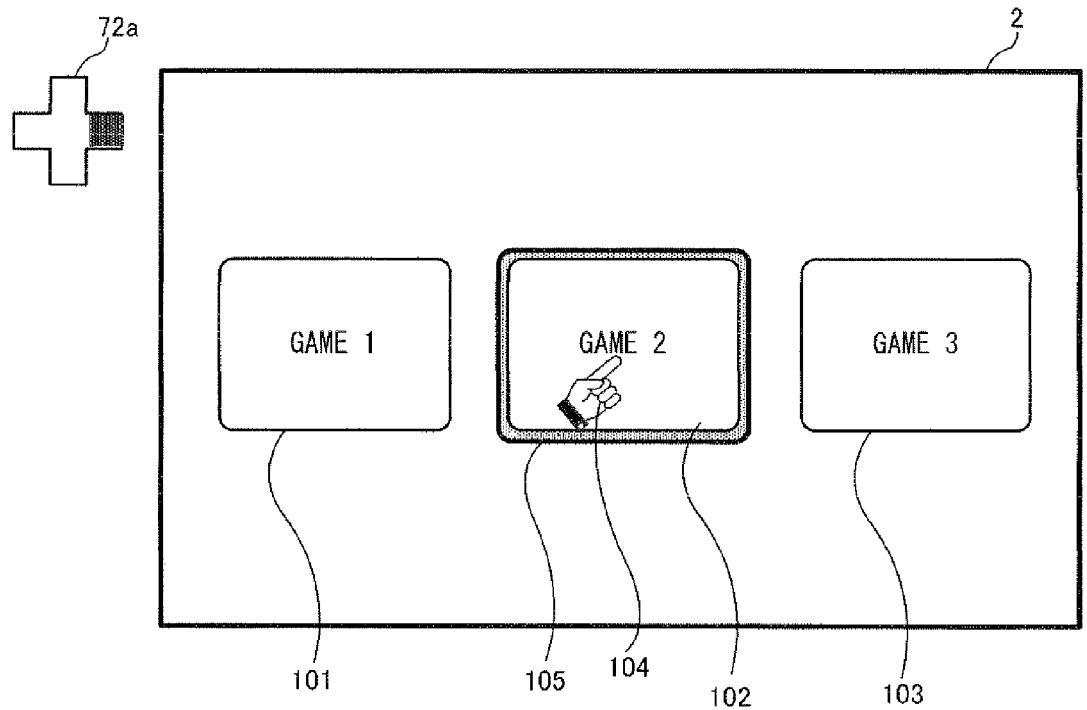
FIG. 13 is a diagram showing an exemplary game screen assumed in this embodiment.

Next, a method of switching the two operation modes will be described. In this embodiment, when the cross key 72a is pressed in the pointing mode, the mode is switched to the cross key mode. Specifically, when the player presses the cross key 72a in the state of FIG. 10, any of the objects is selected (in this embodiment, the immediately previously selected object is assumed to be still selected). Here, when the cross key mode is continued, the pointer 104 is not moved even if the designated position on the screen is changed. For example, even when the designated position of the controller 7 is moved upward on the screen while the object 102 is selected as shown in FIG. 13, the displayed position of the pointer 104 is not moved and the object 102 remains selected.

Figure 15:
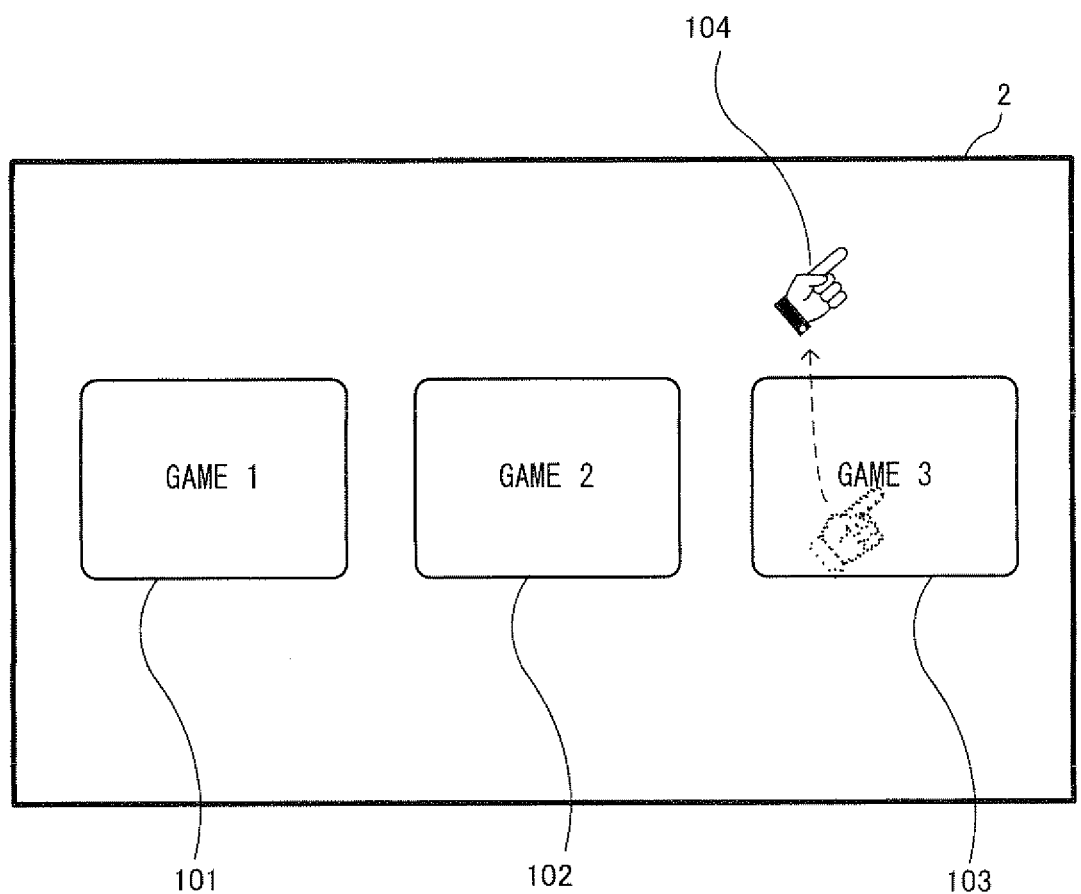
FIG. 15 is a diagram showing an exemplary game screen assumed in this embodiment.

On the other hand, when the cross key mode is switched to the pointing mode, an operation of "swinging" the controller 7 is performed. In this embodiment, based on acceleration data output from the acceleration sensor 701, it is detected whether or not the "swing" operation has been performed. Specifically, if an acceleration having a predetermined magnitude or more (generated by "swinging") is detected within a predetermined time in the cross key mode, the operation mode is switched to the pointing mode. For example, when the controller 7 is swung while the object 103 is selected as shown in FIG. 14, the operation mode is switched to the pointing mode, and at the same time, the pointer 104 is displayed at a designated position detected at that time, as shown in FIG. 15.

Note that the cross key mode may be switched to the pointing mode when the cumulative value of movement amounts of the controller 7 that are calculated based on the acceleration data exceeds a predetermined threshold. Alternatively, the cross key mode may be switched to the pointing mode when the amount of a change in acceleration per unit time (e.g., one frame) exceeds a predetermined threshold. Alternatively, the cross key mode may be switched to the pointing mode when the cumulative value of the change amounts exceeds a predetermined threshold.

Thus, by switching the two operation modes by "swinging" the controller 7, the modes can be switched in quick response without an unnatural operation. Specifically, in this embodiment, since the controller 7 is held and operated as shown FIG. 9, the swing operation (e.g., a snap operation in which a wrist is twisted) is similar to a manner in which the controller 7 is moved by a pointing operation in that the controller 7 is moved by using an elbow or a wrist while directing the tip of the controller 7 toward the screen. Therefore, there is a high level of affinity between the "swing" operation and the "pointing" operation. Therefore, the cross key mode can be switched to the pointing mode with a natural operation and quickly (after the swing operation, the pointing operation can be performed without changing the holding manner of the controller 7 or the like). Moreover, the pointing mode can be switched to the cross key mode only by pressing the cross key 72a. Therefore, the pointing mode and the cross key mode can be switched in quick response.

Note that, in this embodiment, when the cross key 72a is not operated for a predetermined or more in the cross key mode and the screen is being pointed by the controller 7, the cross key mode is also automatically switched to the pointing mode, thereby enhancing the convenience for the player.

Figure 16:
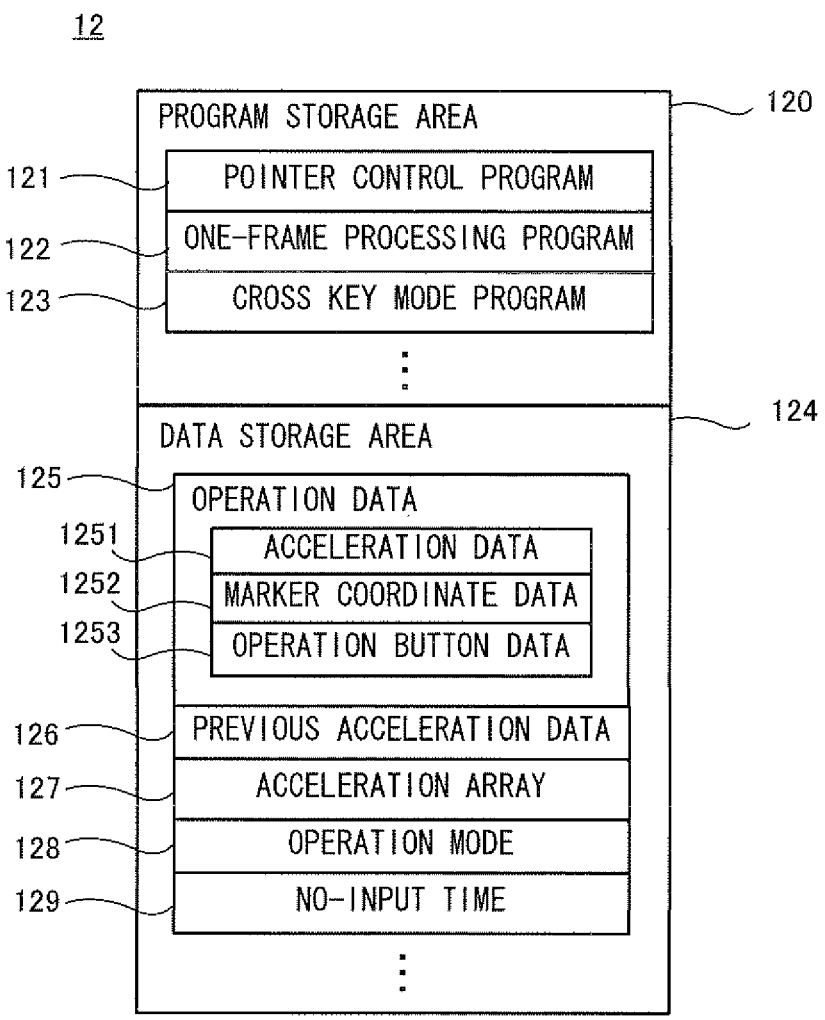
FIG. 16 is a diagram showing a memory map of a main memory 12.

Next, a game process executed by the game apparatus main body 3 will be described in detail. Firstly, data that is to be stored in the external main memory 12 in the game process will be described. FIG. 16 is a diagram showing a memory map of the external main memory 12 of the game apparatus main body 3. In FIG. 16, the external main memory 12 includes a program storage area 120 and a data storage area 124. The data stored in the program storage area 120 and the data storage area 124 is stored on the optical disc 4 and is transferred to the external main memory 12 when a game program is executed.

A game program that is executed by the CPU 10 is stored in the program storage area 120. The game program includes a pointer control program 121, a one-frame process program 122, a cross key mode program 123, and the like.

In the data storage area 124, data, such as operation data 125, a previous acceleration vector 126, an acceleration array 127, an operation mode 128, a no-input time 129 and the like, and in addition, various variables and flags that are used during execution of a program are stored.

The operation data 125 is operation data that is transmitted from the controller 7 to the game apparatus main body 3. As described above, operation data is transmitted once per 1/200 sec from the controller 7 to the game apparatus main body 3, so that the operation data 125 stored in the main memory 12 is updated at this frequency. In this embodiment, only latest (last obtained) operation data may be stored in the main memory 12.

The operation data 125 includes acceleration data 1251, marker coordinate data 1252, and operation button data 1253. The acceleration data 1251 is data that indicates an acceleration (acceleration vector) detected by the acceleration sensor 701. Here, the acceleration data 1251 indicates a three-dimensional acceleration vector V1 that has, as its components, accelerations along the directions of the three axes (x, y, z) of FIG. 2. Also, in this embodiment, the magnitude of the acceleration vector V1 detected by the acceleration sensor 701 when the controller 7 remains at rest is assumed to be "1". In other words, the magnitude of the gravity acceleration detected by the acceleration sensor 701 is "1".

The marker coordinate data 1252 is coordinates that are calculated by the image processing circuit 744 of the image capture information computing section 74, i.e., data indicating the marker coordinates. The marker coordinates are represented by a two-dimensional coordinate system (the xy coordinate system of FIG. 8) for representing a position on a plane corresponding to a captured image. Note that when images of the two markers 8R and 8L are captured by the image capturing device 743, two marker coordinate points are calculated. On the other hand, when one of the markers 8R and 8L is not located within a range in which an image can be captured by the image capturing device 743, the image capturing device 743 captures an image of only the other marker and calculates only one marker coordinate point. When none of the markers 8R and 8L is Located within the range in which an image can be captured by the image capturing device 743, the image capturing device 743 captures no marker image and calculates no marker coordinate point. Therefore, the marker coordinate data 1252 may indicate two marker coordinate points, only one marker coordinate point, or no marker coordinate point.

The operation button data 1253 is data that indicates input states of the operation buttons 72a to 72i. Therefore, the operation button data 1253 also includes data that indicates a pressed state of the cross key 72a (which of the upward, downward, leftward and rightward directions is pressed down).

The previous acceleration vector 126 is data that indicates an acceleration vector that is calculated immediately before the acceleration data 1251. More specifically, the unit time of a game process of this embodiment is 1/60 sec, and processes described below are also repeatedly performed in units of 1/60 sec. The acceleration data is one that is calculated by a current process loop. The previous acceleration vector 126 is vector data that indicates an acceleration that is calculated by the immediately previous process loop.

The acceleration array 127 is a set of data (one-dimensional array) that is used in a process described below to determine whether to switch the operation modes, and represents the history of change amounts of the acceleration. It may also be hereinafter assumed that the number of elements in the array is N and is counted from "0", and the array is represented by an acceleration array Q[0] to Q[N−1]. The storage technique is a so-called FIFO (First In First Out). The latest data is stored in Q[0] and the oldest data is stored in Q[N−1].

The operation mode 128 is a flag that indicates whether the current operation mode is in the "pointing mode" or in the "cross key mode". In this embodiment, the operation mode 128 is set to be "0" in the "pointing mode", and "1" in the "cross key".

The no-input time 129 is a variable for counting a time for which there is no input to the cross key 72a in the cross key mode (a time for which the cross key 72a is not pressed down).

Figure 17:
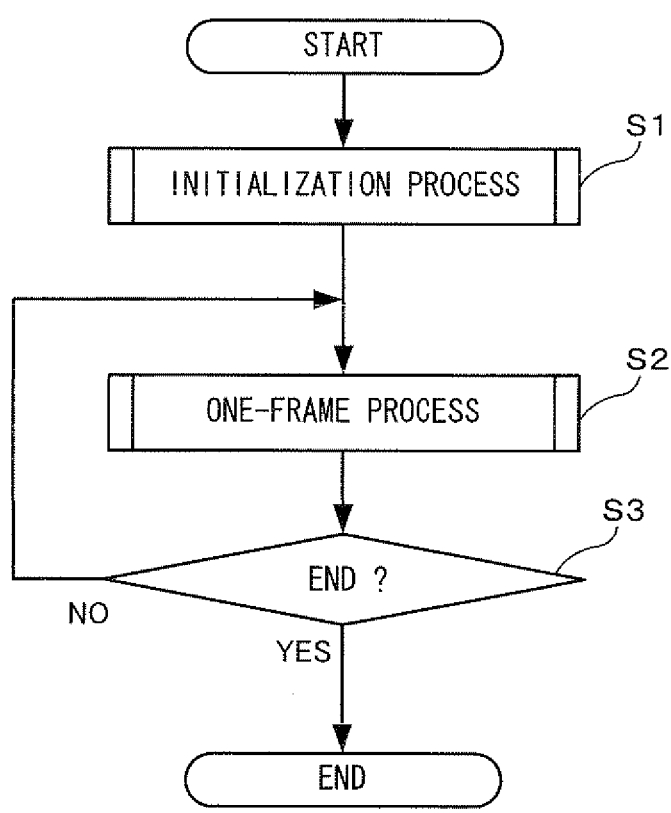
FIG. 17 is a flowchart showing a game process according to an embodiment of the present invention.

Next, a game process that is executed by the game apparatus main body 3 will be described with reference to FIGS. 17 to 20. When the game apparatus main body 3 is powered ON, the CPU 10 of the game apparatus main body 3 executes the boot program stored in the ROM/RTC 13, thereby initializing units, such as the main memory 33 and the like. Thereafter, a game program stored on the optical disc 4 is read into the external main memory 12, and the CPU 10 starts execution of the game program. FIG. 17 is a flowchart showing a game process that is performed after completion of the aforementioned process. A process loop of steps S2 and S3 of FIG. 17 is executed for each frame. Note that, in the flowchart of FIG. 17, control and object selection of the pointer 104 that are performed based on an operation of the controller 7 by executing a pointer control program included in the game program, will be described, and other processes that are not directly related to the present invention will not be described in detail.

Figure 18:
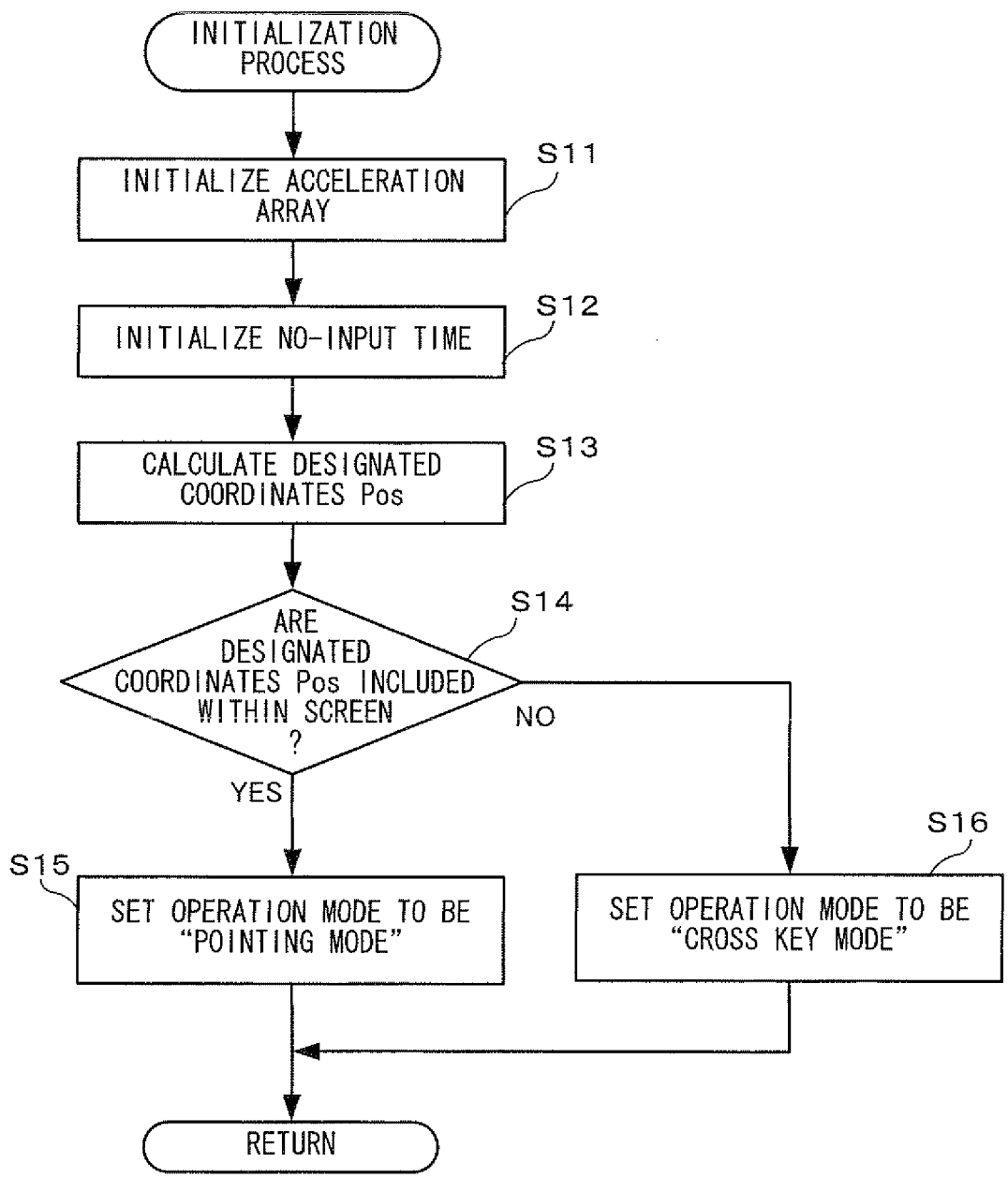
FIG. 18 is a flowchart showing an initialization process shown in step S1 of FIG. 17 in detail.

In FIG. 17, initially, the CPU 10 executes an initialization process (step S1). FIG. 18 is a flowchart showing a detail of the initialization process of step S1. In FIG. 18, initially, the CPU 10 initializes the acceleration array 127 (step S11). More specifically, the CPU 10 sets "0" into variables included in the acceleration array 127.

Next, the CPU 10 initializes the no-input time 129 (step S12). Specifically, the CPU 10 sets "0" into the no-input time 129.

Next, the CPU 10 executes a process of calculating a designated coordinates Pos (step S13). The designated coordinates Pos are a variable for representing a position that is pointed or designated by the controller 7. The process of step S13 will be described in more detail. Initially, the CPU 10 calculates the designated coordinates Pos of the controller 7 from the operation data 125, based on the marker coordinate data 1252. Here, the designated coordinates Pos may be calculated by any calculation method. For example, the following method is contemplated.

Hereinafter, an exemplary method of calculating the designated coordinates Pos will be described. The operation data 125 obtained from the controller 7 includes the marker coordinate data 1252 that is data indicating the marker coordinates. The data indicates two marker coordinate points of the markers 8L and 8R (see FIG. 8) Initially, the CPU 10 calculates a middle point between the two marker coordinate points. The middle point is represented by the xy coordinate system for representing a position on a plane corresponding to a captured image. Next, the CPU 10 converts coordinates indicating the position of the middle point into coordinates in a coordinate system (x'y' coordinate system) for representing a position on the screen of the television 2. This conversion can be carried out by using a function that converts the coordinates of a middle point calculated from a captured image into coordinates on the screen corresponding to an actual designated position of the controller 7 when the captured image is taken. In this case, the designated position of the controller 7 is moved in a direction opposite to the positions of the marker coordinate points in the captured image, i.e., the direction is vertically or laterally reversed. The thus-calculated x'y' coordinate values are the designated coordinates Pos of the controller 7. Note that, as described above, the marker coordinate data 1252 may indicate the absence of a marker coordinate point. In such a case, data (e.g., a NULL value) for indicating the absence of a marker coordinate point is set into the designated coordinates Pos.

Next, the CPU 10 determines whether or not the designated position indicated by the designated coordinates Pos is included within the screen (step S14). Specifically, the CPU 10 determines whether or not the front surface of the controller 7 (a side through which light to be captured by the image capture information computing section 74 enters) is directed toward the screen. More specifically, when the designated coordinates Pos indicate the absence of a marker coordinate point, the CPU 10 determines that the designated position indicated by the designated coordinates Pos is not included within the screen, and when otherwise, the CPU 10 determines that the designated position indicated by the designated coordinates Pos is included within the screen.

Next, the CPU 10 sets an operation mode. Specifically, when, as a result of the determination in step S14, the CPU 10 determines that the designated position indicated by the designated coordinates Pos is included within the screen (YES in step S14), the CPU 10 sets "0" indicating the "pointing mode" into the operation mode 128 (step S15). On the other hand, when the CPU 10 determines that the designated position indicated by the designated coordinates Pos is not included within the screen (NO in step S14), the CPU 10 sets "1" indicating the "cross key mode" into the operation mode 128 (step S16). Thus, the initialization process is completed.

Figure 19:
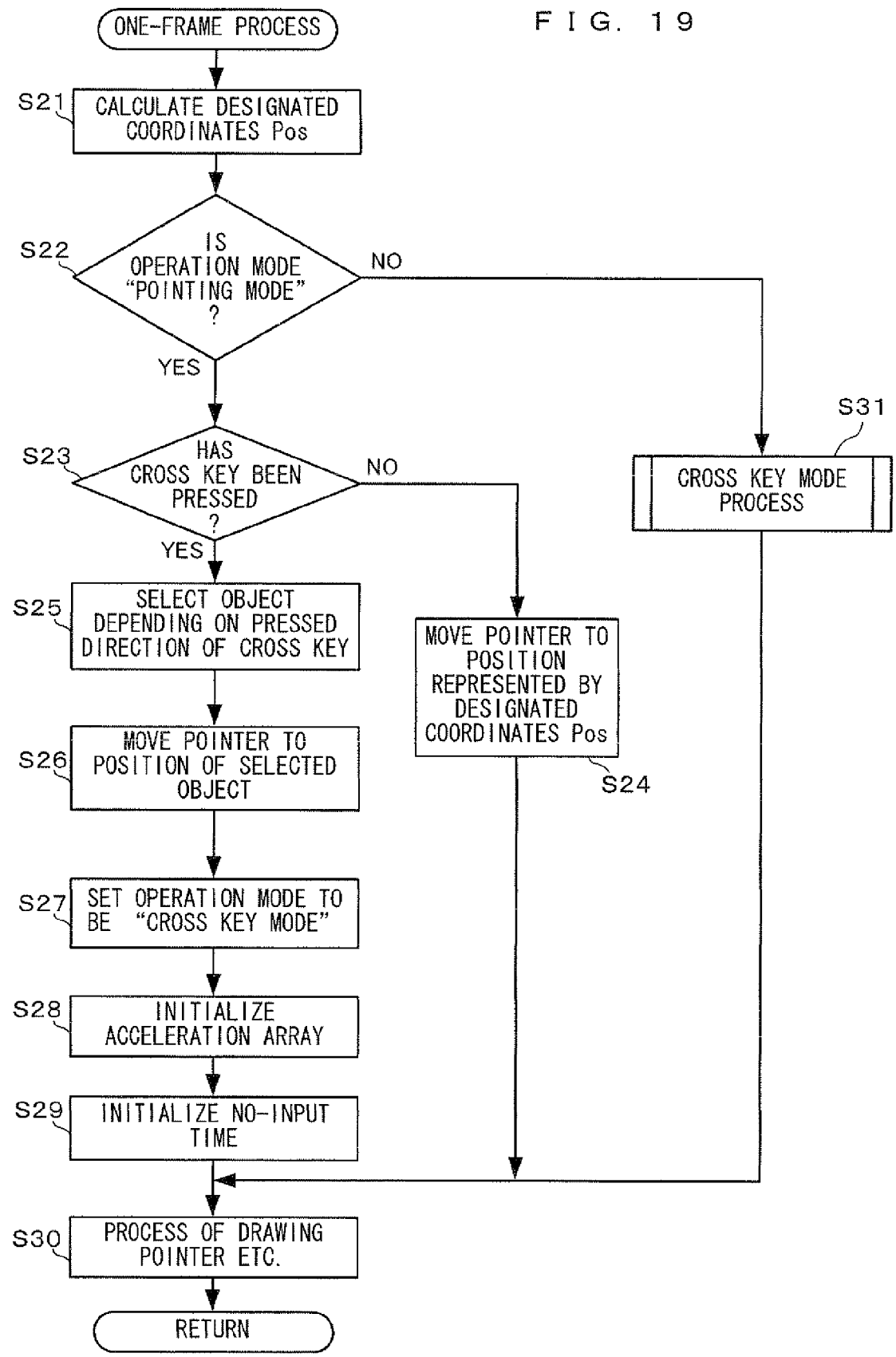
FIG. 19 is a flowchart showing a one-frame process shown in step S2 of FIG. 17 in detail.

Referring back to FIG. 17, when the initialization process is completed, the CPU 10 next executes a one-frame process (step S2). FIG. 19 is a flowchart showing the one-frame process of step S2 in detail. In FIG. 19, initially, the CPU 10 executes a process of calculating the designated coordinates Pos (step S21). This process is similar to that of step S13 and will not be described.

Next, the CPU 10 determines whether or not the current operation mode is the "pointing mode", with reference to the operation mode 128 (step S22). In other words, the CPU 10 determines whether or not the operation mode 128 has the value "0". When the CPU 10 determines that the operation mode is not the "pointing mode" (NO in step S22), the CPU 10 executes a cross key mode process (step S31). This process will be described below.

On the other hand, when the operation mode is the "pointing mode" (YES in step S22), then the CPU 10 determines whether or not the cross key 72*a* has been pressed down, with reference to the operation button data 1253 (step S23). When the CPU 10 determines that the cross key 72*a* has not been pressed down (NO in step S23), the CPU 10 executes a process of moving the pointer 104 to a position on the screen indicated by the designated coordinates Pos (step S24). In other words, the "pointing mode" process is continued. In this case, when the pointer 104 is moved to any object (i.e., any of the objects is pointed by the pointer 104), the object is selected (more specifically, a focus is set on the object, which is then in the selected stated). Moreover, the CPU 10 arranges the selection frame 105 around the selected object. Thereafter, the CPU goes to step S30 described below in which the pointer 104 is drawn at a position where the pointer 104 has been moved (when any object is selected, the selection frame 105 is also drawn).

On other hand, when the CPU 10 determines in step S23 that the cross key 72*a* has been pressed down (YES in step S23), the CPU 10 executes a process of selecting any of the objects within the screen (step S25). Specifically, when the CPU 10 executes the determination, then if any of the objects has already been selected (see, for example, FIG. 11), an object is selected that is closest to a designated position of the objects present in the pressed direction of the cross key 72*a* with reference to the position of the selected object. When the CPU 10 executes the determination, then if no object has been selected (see, for example, FIG. 10), an object is selected that is closest to the current designated position (a position indicated by the designated coordinates Pos) (when there are a plurality of closest objects, an object present in the pressed direction of the cross key 72*a* is selected). In other words, by this process, when the cross key 72*a* is pressed down in the pointing mode, any of the objects is immediately selected.

Next, the CPU 10 moves the pointer 104 to a position in the vicinity of a center of the selected object (an object on which a focus is set) (see FIGS. 13 and 14) (step S26). In this case, the CPU 10 also places the selection frame 105 at the selected object.

Next, the CPU 10 sets, into the operation mode 128, "1" that is a value indicating the cross key mode (step S27).

Next, the CPU 10 initializes the acceleration array 127 (step S28) and initializes the no-input time 129 (step S29).

Next, the CPU 10 executes a drawing process (step S30) Specifically, a process of generating an image as shown in FIG. 10 or the like, and displaying it as a game image on the television 2 is executed. Thereafter, the CPU 10 ends the one-frame process.

Figure 20:
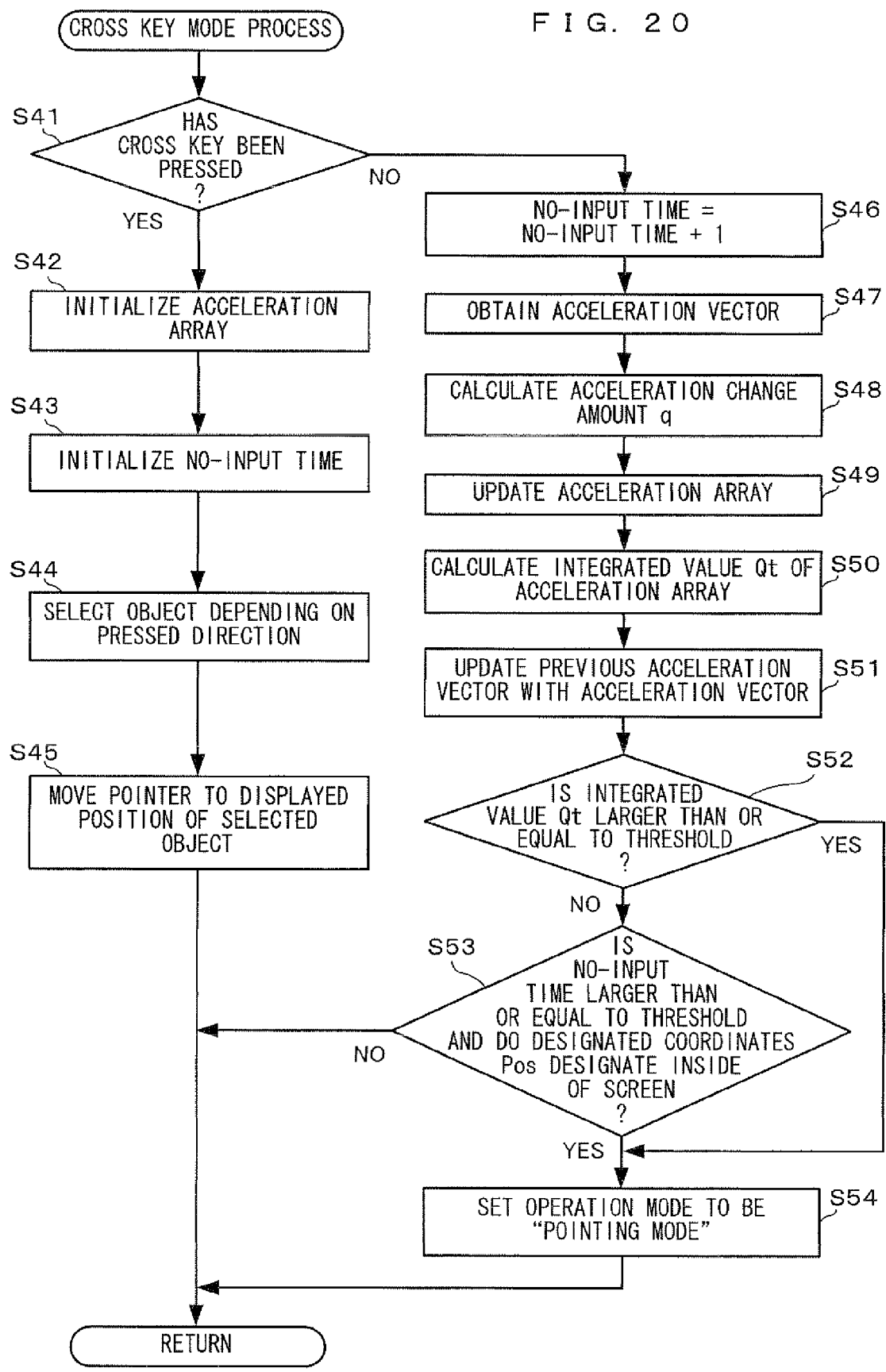
FIG. 20 is a flowchart showing a cross key mode process shown in step S31 of FIG. 19 in detail.

Next, a process when the CPU 10 determines in step S22 that the operation mode is the "cross key mode" (the value of the operation mode 128 is "1") will be described. In this case, the CPU 10 executes a cross key mode process (step S31). FIG. 20 is a flowchart showing the cross key mode process of step S31 in detail. In FIG. 20, initially, the CPU 10 determines whether or not the cross key 72*a* has been pressed down, with reference to the operation button data 1253 (step S41). When the CPU 10 determines that the cross key 72*a* has been pressed down (YES in step S41), a process of continuing the cross key mode process is executed. Initially, the CPU 10 initializes the acceleration array 127 (step S42) and initializes the no-input time 129 (step S43).

Next, the CPU 10 executes a process of selecting an object, depending on the pressed direction of the cross key 72*a* (step S44). Specifically, an object is selected that is closest of the objects present in the pressed direction of the cross key 72*a* with reference to the position of the previously selected object. Also, as described above with reference to FIGS. 11 and 13, when the "left" direction is pressed while the leftmost object 101 is selected within the screen, then the rightmost object 103 is selected. Similarly, when the "right" direction is pressed while the rightmost object 103 is selected, then the leftmost object 101 is selected.

Next, the CPU 10 moves the pointer 104 to a position in the vicinity of a center of the selected object (see FIG. 13, etc.)

(step S45). Also, in this case, the CPU 10 places the selection frame 105 at the selected object. Thereafter, the CPU 10 ends the cross key mode process.

Next, a process when the CPU 10 determines in step S41 that the cross key 72a has not been pressed will be described (NO in step S41). In this case, the CPU 10 determines whether or not the controller 7 has been swung or the like, and executes a process of switching the cross key mode to the pointing mode, depending on the result of the determination. Specifically, initially, the CPU 10 adds "1" to the no-input time 129 (step S46). Next, the CPU 10 obtains the acceleration vector V1 by referencing the acceleration data 1251 (step S47).

Next, the CPU 10 obtains the previous acceleration vector 126 and calculates an amount q of a change in acceleration (step S48). The acceleration change amount q is the amount of a change from an acceleration vector calculated by a process with respect to the immediately previous frame to an acceleration vector calculated by a process with respect to the current frame. The change amount q is, for example, calculated as follows. Initially, a change vector Vs is calculated by:

the change vector $Vs$=the acceleration vector $V1$−the previous acceleration vector $V2$.

The magnitude (scalar value) of the calculated change vector Vs is defined as the change amount q.

Next, the CPU 10 updates the acceleration array (step S49). Specifically, the CPU 10 updates data of the acceleration array element Q[N−1] with data of Q[N−2], data of Q[N−2] with data of Q[N−3], and so on. Finally, the calculated change amount q is stored into the acceleration array element Q[0].

Next, the CPU 10 calculates an integrated value Qt of the values of the acceleration array 127 (step S50) by:

the integrated value $Qt=Q[0]+Q[1]+Q[2]+ \ldots +Q[N-1]$.

Next, the previous acceleration vector 126 is updated with the value of the acceleration vector V1 (step S51).

Next, the CPU 10 determines whether or not the integrated value Qt calculated in step S50 is larger than or equal to a predetermined threshold (step S52). Specifically, the CPU 10 determines whether or not the amount of a change in acceleration within a predetermined time that is indicated by the number of elements of the acceleration array 127 is sufficiently large so that an operation of the controller 7 can be determined as "swing". When the CPU 10 determines that the integrated value Qt is larger than or equal to the first threshold (YES in step S52), it is considered that a "swing" operation has been performed, so that the CPU 10 sets "0" (a value indicating the pointing mode) into the operation mode 128 (step S54).

On the other hand, when the integrated value Qt is not larger than or equal to the threshold (NO in step S52), then the CPU 10 determines whether or not the no-input time 129 is larger than or equal to a predetermined second threshold and a position indicated by the designated coordinates Pos is included within the screen (step S53). Specifically, the CPU 10 determines whether or not the cross key 72a has not been pressed down for a predetermined time or more and the player is pointing the screen using the controller 7. When the CPU 10 determines that the aforementioned conditions are satisfied (YES in step S53), the CPU 10 goes to step S54, and executes a process of setting the operation mode to be the "pointing mode". Specifically, when the player has not pressed the cross key 72a for a predetermined time while keeping the front surface of the controller 7 directed toward the screen in the "cross key mode", the CPU 10 switches the operation mode to the pointing mode.

On the other hand, when the CPU 10 determines in step S53 that the aforementioned conditions are not satisfied (NO in step S53), the CPU 10 ends the cross key mode process. If the cross key mode process is ended, the CPU 10 goes to the process of step S30 of FIG. 19, so that the process of drawing the pointer 104 or the like is executed, and then the one-frame process is ended.

Referring back to FIG. 17, after the one-frame process of step S2, the CPU 10 determines in step S3 whether to end the game. When the result is YES, the CPU 10 ends the game process, and when the result is NO, the CPU 10 goes back to step S2, and then repeats the game process. Thus, the game process of this embodiment is ended.

Thus, in this embodiment, when a "swing" operation is detected during an operation of the cross key 72a, she operation mode is switched to the pointing mode. Also, the operation mode is switched to the cross key mode by pressing the cross key 72a during a pointing operation. In other words, when a motion that is directly linked to an operation to be subsequently performed (specifically, an operation of performing selection using the cross key 72a) is desired, the cross key 72a is pressed down. When the player desires to perform a pointing operation by moving the pointer 104, the player swings the controller 7 itself. These operations can switch the operation modes. Thereby, a plurality of selection operation methods can be switched in quick response and with an operation free of unnaturalness.

Also, as described above, in this embodiment, change amounts of acceleration data are accumulated in the finite acceleration array 127, and depending on whether or not the integrated value exceeds a predetermined threshold, it is determined whether or not the cross key mode is switched to the pointing mode. By thus buffering acceleration data in a finite array, it is, for example, possible to avoid a situation that when a motion applied to the controller 7 is small but is continued for a long time, and therefore, acceleration data is accumulated for a long time, so that the aforementioned switching of the operation modes is falsely executed. In other words, if a certain level of motion that can be considered to be a "swing" operation does not occur for a predetermined period of time (depending on the number of elements of the array), the operation modes are not switched, so that the switching of the operation modes that is not intended by the user can be prevented from occurring. The length of the predetermined period of time (the number of elements of the array) may be set as appropriate, depending on the game process or the like.

Although it has been assumed in the embodiment above that acceleration data output from an acceleration sensor is used to detect a "swing" operation, the "swing" operation may be detected based on angular velocity data output from a gyro-sensor. In this case, for example, the controller 7 includes a three-axis gyro-sensor. Alternatively, an extension unit including the three-axis gyro-sensor may be connected to the controller 7. Thereafter, an angular velocity may be detected and output as angular velocity data, and may be used instead of or in combination with the acceleration data, thereby executing detection of a "swing" operation.

Further, a change amount of a designated position may be used instead of detection of a "swing" operation. Specifically, when a large change occurs in a designated position within a predetermined time, it may be determined that a large "motion" is applied to the controller 7, and the operation mode may be switched to the pointing mode. For example, in the aforementioned cross key mode process, the designated coordinates Pos may be stored as data indicating a designated position in the previous frame in the external main memory 12, and in the next process loop, a change amount between a designated coordinate point in the previous frame and the current designated coordinate point is calculated. Thereafter, if the change amount exceeds a predetermined threshold, the operation mode may be switched to the pointing mode. The present invention is not limited to the comparison with the designated coordinate point in the previous frame. A change amount of designated coordinates for a period of time corresponding to several frames to several tens of frames may be calculated and used to determine whether to switch the operation modes.

Also, the present invention is not limited to the acceleration, the angular velocity, and the change amount of the designated position as described above. Any method that can detect a "motion" applied to the controller 7 in the cross key mode may be employed. The cross key mode may be switched to the pointing mode, depending on the magnitude of the motion.

Figure 21:
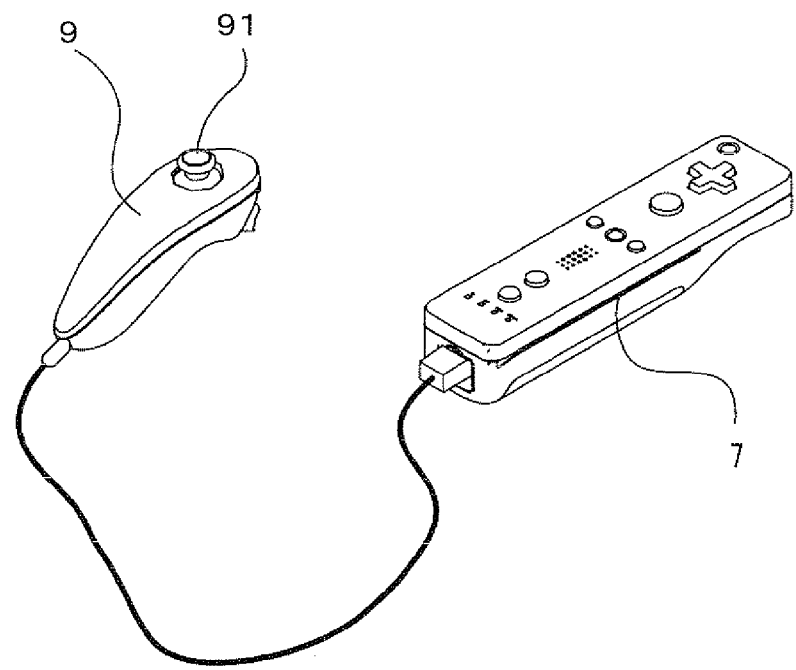
FIG. 21 is a diagram showing the controller 7 to which an extension controller 9 is connected.
Figure 22:
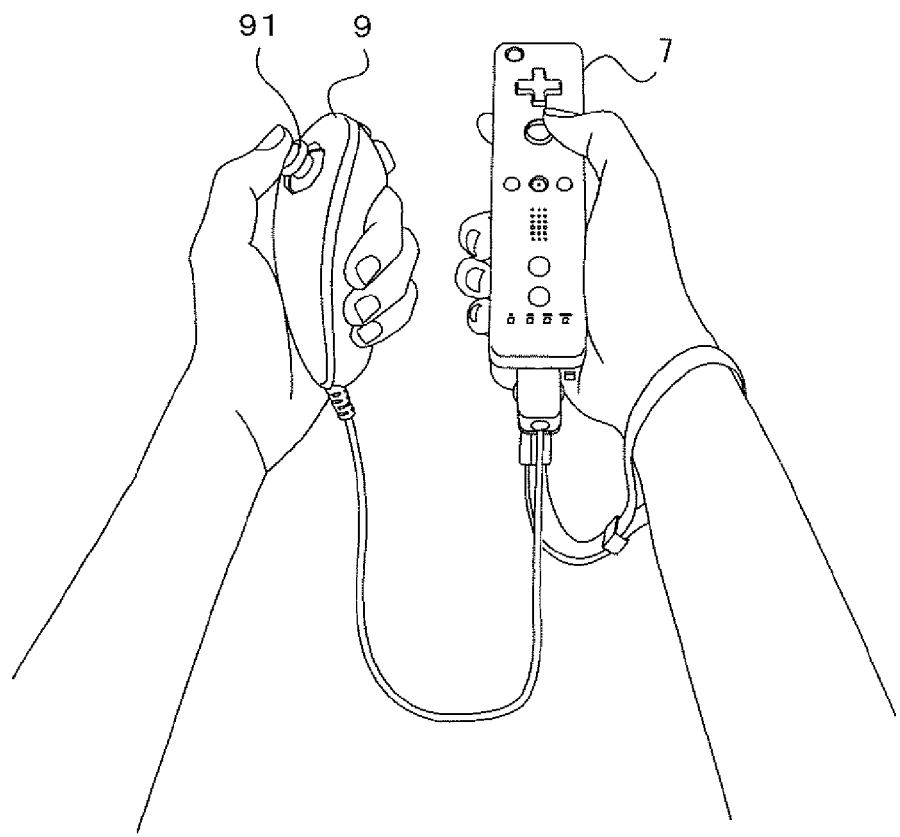
FIG. 22 is a diagram showing a manner of holding the controller 7 to which an extension controller 9 is connected.

Although it has also been assumed in the embodiment above that a single housing (the controller 7) can be used to perform two kinds of operations, i.e., the cross key mode and the pointing mode, the present invention is not limited to this. A plurality of housings may be utilized. For example, as shown in FIG. 21, an extension controller 9 is connected to the connector 73 of the controller 7. For example, when playing a game, the player holds the controller 7 with his/her right hand while holding the extension controller 9 with his/her left hand, as shown in FIG. 22. In this case, the player holds the controller 7 while directing the front surface (a side through which light to be captured by the image capture information computing section 74 enters) of the controller 7 held with the right hand toward the markers 8L and 8R. The extension controller 9 includes a stick 91. It is assumed that an operation similar to that in the cross key mode can be performed by operating the stick 91. When the player performs an operation using the stick 91 (cross key mode), then if the player swings the controller 7 held with his/her right hand, the cross key mode is then switched to the pointing mode. Also, if the player operates the stick 91 of the extension controller 9 held by his/her left hand in the pointing mode, then the pointing mode is switched to the cross key mode. Moreover, in this case, the cross key 72a of the controller 7 may be effective. Specifically, the stick 91 of the extension controller 9 or the cross key 72a of the controller 7 is caused to be ready to be performed in the cross key mode. If the stick 91 or the cross key 72a is pressed down in the pointing mode, the pointing mode may be switched to the cross key mode.

Also, when a plurality of housings are utilized as described above, each housing may include an acceleration sensor, and the operation modes may be switched in accordance with any housing that is swung. In the aforementioned example, for example, when the controller 7 held by the right hand is swung, the operation mode may be switched to the pointing mode, and when the extension controller 9 held by the left hand is swung, the operation mode may be switched to the cross key mode. In this case, acceleration data output from each controller may be associated with and accompanied by identification information indicating the output source controller.

Also, when a plurality of housings are utilized (e.g., two housings are used), each housing may include a pointing device and an acceleration sensor, and the pointing device of one of the housing for which "swing" is detected may be switched to perform an operation.

Although it has also been assumed in the embodiment above that any of the objects displayed on the screen is invariably selected in the cross key mode, the present invention is not limited to this. The pointer 104 may be moved by a predetermined distance, depending on a direction in which the cross key 72a is pressed down. In other words, in the cross key mode, the cross key 72a may be used to move the pointer 104.

The selection operation in the cross key mode may be performed using a single predetermined button instead of the cross key 72a. For example, objects may be sequentially switched in a predetermined order every time the operation button 72b is pressed in the cross key mode (a focus may be moved in a predetermined order).

The present invention is also applicable not only to game processes as described above, but also to general selection operations In other information processes.

While the invention has been described in detail, the foregoing description is in all aspects illustrative and not restrictive. It is understood that numerous other modifications and variations can be devised without departing from the scope of the invention.

What is claimed is:

1. A non-transitory computer-readable recording medium recording an information processing program executable by a computer of an information processing apparatus for designating a position on a screen based on outputs of a plurality of input devices including at least one pointing device, the program causing the computer to execute functionality comprising:
    designating the position on the screen to correspond to a position of an on-screen object that is selected using a key selection operation of at least one of the plurality of input devices;
    obtaining motion information that is information about a motion applied to a first input device housing itself including the pointing device;
    calculating a movement amount of the first input device housing based on the motion information;
    accumulating the calculated movement amounts;
    determining whether or not the cumulative value of the accumulated calculated movement amounts exceeds a predetermined threshold; and
    designating a new position on the screen, to correspond to a current pointing direction of the pointing device configured to be positioned outside of an area of the selected on-screen object, at a time when the cumulative value exceeds the predetermined threshold.

2. The non-transitory computer-readable recording medium according to claim 1, wherein
    the first input device housing further includes a non-pointing device that is an input device that is not a pointing device, of the plurality of input devices, and
    the information processing program causes the computer to further execute:
        determining whether or not an input to the non-pointing device has occurred when position designation is being performed; and
        designating a position based on an output from the non-pointing device when an input to the non-pointing device has occurred.

3. The non-transitory computer-readable recording medium according to claim 1, wherein
    a non-pointing device that is an input device that is not a pointing device, of the plurality of input devices, is included in a second input device housing, and
    the information processing program causes the computer to further execute:

determining whether or not an input to the non-pointing device has occurred when position designation is being performed; and performing position designation based on an output from the non-pointing device when an input to the non-pointing device has occurred.

4. The non-transitory computer-readable recording medium according to claim 1, wherein the information processing program causes the computer to further execute:

switching a position designation mode between a first position designation mode in which position designation is performed and a second position designation mode in which position designation is performed based on an output from a non-pointing device that is an input device that is not a pointing device, and switching the position designation mode to the first position designation mode if the movement amount exceeds a predetermined threshold when the position designation mode is the second position designation mode, and switching the position designation mode to the second position designation mode if an input to the non-pointing device has occurred when the position designation mode is the first position designation mode.

5. The non-transitory computer-readable recording medium according to claim 4, wherein the information processing program causes the computer to further execute:

measuring a period of time during which it is determined that there is not an input to the non-pointing device when the position designation mode is the second position designation mode, and switching the position designation mode to the first position designation mode when the measured period of time exceeds a predetermined value.

6. The non-transitory computer-readable recording medium according to claim 1, wherein the first input device housing includes a motion sensor for detecting a motion applied to the first input device housing itself, and data output from the motion sensor as the motion information is obtained.

7. The non-transitory computer-readable recording medium according to claim 1, wherein data indicating a position designated by the pointing device, as the motion information, is repeatedly obtained, and the movement amount based on a change amount of the designated positions of the pointing device is calculated.

8. The non-transitory computer-readable recording medium according to claim 1, wherein the movement amounts are accumulated for a predetermined period of time until a current time.

9. The non-transitory computer-readable recording medium according to claim 1, wherein the information processing program causes the computer to further execute:

resetting the cumulative value when an input has occurred with respect to an input device other than the pointing device.

10. The non-transitory computer-readable recording medium according to claim 1, wherein the information processing program causes the computer to further execute:

calculating a change amount of the calculated movement amounts, and determining whether or not the calculated change amount exceeds a predetermined threshold.

11. The non-transitory computer-readable recording medium according to claim 10, wherein the information processing program causes the computer to further execute:

accumulating the calculated change amounts, and determining whether or not the cumulative change amount of the accumulated calculated change amounts exceeds a predetermined threshold.

12. The non-transitory computer-readable recording medium according to claim 11, wherein the change amounts are accumulated for a predetermined period of time until a current time.

13. The non-transitory computer-readable recording medium according to claim 11, wherein the information processing program causes the computer to further execute:

resetting the cumulative change amount when an input has occurred with respect to an input device other than the pointing device.

14. The non-transitory computer-readable recording medium according to claim 1, wherein the first input device housing includes an image capturing device for capturing an image of at least one object whose image is to be captured and which is located in a vicinity of a display device, captured image data output from the first input device housing is obtained, and a position is designated based on an object whose image is to be captured is shown in a captured image indicated by the captured image data.

15. A non-transitory computer-readable recording medium recording an information processing program executable by a computer of an information processing apparatus for selecting one of a plurality of objects displayed on a screen, the program causing the computer to execute functionality comprising:

obtaining motion information that is information about a motion applied to a predetermined input device housing itself used for an operation of selecting the objects;

calculating a movement amount of the input device itself based on the motion information;

accumulating the calculated movement amounts;

switching a selection mode based on the motion information, between a pointing selection mode and a key selection mode, the pointing selection mode being a selection mode in which a new position on the screen is configured to be designated, and any of the objects displayed on the screen are configured to be selected by designating a position where the object is displayed, and the key selection mode being a selection mode in which setting of a focused state indicating a selected state is changed among the objects displayed on the screen in a predetermined order, depending on a predetermined key input; and switching the selection mode to the pointing selection mode from the key selection mode at a time when the cumulative value of the accumulated calculated movement amounts exceeds a predetermined threshold and designating the position on the screen to a current pointing direction of the predetermined input device configured to be positioned outside of an area of a selected on-screen object.

16. The non-transitory computer-readable recording medium according to claim 15, wherein the information processing program causes the computer to further execute:
- determining whether or not the predetermined key input has been performed when the selection mode is the pointing selection mode;
- calculating a movement amount of the input device itself based on the motion information when the selection mode is the key selection mode; and
- switching the selection mode to the key selection mode when the key input has been performed, and switching the selection mode to the pointing selection mode when the calculated movement amount exceeds a predetermined threshold.

17. The non-transitory computer-readable recording medium according to claim 15, wherein
the input device housing includes a motion sensor for detecting a motion applied to the input device housing itself, and
data output from the motion sensor as the motion information is obtained.

18. The non-transitory computer-readable recording medium according to claim 15, wherein
the movement amounts are accumulated for a predetermined period of time until a current time.

19. The non-transitory computer-readable recording medium according to claim 15, wherein
the information processing program causes the computer to further execute:
resetting the cumulative value when the predetermined key input has been performed.

20. The non-transitory computer-readable recording medium according to claim 15, wherein
the information processing program causes the computer to further execute:
calculating a change amount of the calculated movement amounts, and
switching the selection mode to the pointing selection mode when the calculated change amount exceeds a predetermined threshold.

21. The non-transitory computer-readable recording medium according to claim 20, wherein
the information processing program causes the computer to further execute:
accumulating the calculated change amounts, and
switching the selection mode to the pointing selection mode when the cumulative change amount of the accumulated calculated change amounts exceeds a predetermined threshold.

22. The non-transitory computer-readable recording medium according to claim 21, wherein
the change amounts are accumulated for a predetermined period of time until a current time.

23. The non-transitory computer-readable recording medium according to claim 21, wherein
the information processing program causes the computer to further execute:
resetting the cumulative change amount when an input has occurred with respect to an input device other than the pointing device.

24. The non-transitory computer-readable recording medium according to claim 16, wherein
the information processing program causes the computer to further execute:
measuring a period of time during which it is determined that the key input is not being performed when the selection mode is the key selection mode, and
switching the selection mode to the pointing selection mode when the measured period of time exceeds a predetermined value.

25. An information processing apparatus for designating a position on a screen based on outputs of a plurality of input devices including at least one pointing device, comprising:
- a first position designating unit for designating the position on the screen to correspond to a position of an on-screen object that is selected using a key selection operation of at least one of the plurality of input devices;
- a motion information obtaining unit for obtaining motion information that is information about a motion applied to a first input device housing itself including the pointing device;
- a movement amount calculating unit for calculating a movement amount of the first input device housing based on the motion information;
- an accumulation unit for accumulating the movement amounts calculated by the movements amount calculating unit;
- a threshold determining unit for determining whether or not the cumulative value of the accumulation unit exceeds a predetermined threshold; and
- a second position designating unit for designating a new position on the screen, to correspond to a current pointing direction of the pointing device configured to be positioned outside of an area of the selected on-screen object, at a time when the threshold determining unit determines that the cumulative value of the accumulation unit exceeds the predetermined threshold.

26. An information processing apparatus for selecting one of a plurality of objects displayed on a screen, comprising:
- a motion information obtaining unit for obtaining motion information that is information about a motion applied to a predetermined input device housing itself used for an operation of selecting the objects;
- a movement amount calculating unit for calculating a movement amount of the input device based on the obtained motion information;
- an accumulation unit for accumulating the movement amounts calculated by the movements amount calculating unit;
- a selection mode switching unit for switching a selection mode based on the motion information, between a pointing selection mode and a key selection mode, the pointing selection mode being a selection mode in which a new position on the screen is configured to be designated, and any of the objects displayed on the screen are configured to be selected by designating a position where the object is displayed, and the key selection mode being a selection mode in which setting of a focused state indicating a selected state is changed among the objects displayed on the screen in a predetermined order, depending on a predetermined key input,
wherein the selection mode switching unit switches the selection mode to the pointing selection mode at a time when the cumulative value of the accumulation unit exceeds a predetermined threshold and designates the position on the screen to a current pointing direction of the predetermined input device configured to be positioned outside of an area of a selected on-screen object.

27. A method for designating a position on a screen of an information processing apparatus having one or more processors based on outputs of a plurality of input devices including at least one pointing device, the method comprising:

designating the position on the screen to correspond to a position of an on-screen object that is selected using a key selection operation of at least one of the plurality of input devices;

obtaining motion information that is information about a motion applied to a first input device housing itself including the pointing device;

calculating, via the one or more processors, a movement amount of the first input device housing based on the motion information;

accumulating the calculated movement amounts;

determining whether or not the cumulative value of the accumulated calculated movement amounts exceeds a predetermined threshold; and designating a new position on the screen, to correspond to a current pointing direction of the pointing device configured to be positioned outside of an area of the selected on-screen object, at a time when the cumulative value exceeds the predetermined threshold.

28. A method for selecting one of a plurality of objects displayed on a screen of an information processing apparatus having one or more processors, the method comprising:

obtaining motion information that is information about a motion applied to a predetermined input device housing itself used for an operation of selecting the objects;

calculating, via the one or more processors, a movement amount of the input device itself based on the motion information;

accumulating the calculated movement amounts;

switching a selection mode based on the motion information, between a pointing selection mode and a key selection mode, the pointing selection mode being a selection mode in which a new position on the screen is configured to be designated, and any of the objects displayed on the screen are configured to be selected by designating a position where the object is displayed, and the key selection mode being a selection mode in which setting of a focused state indicating a selected state is changed among the objects displayed on the screen in a predetermined order, depending on a predetermined key input; and switching the selection mode to the pointing selection mode from the key selection mode at a time when the cumulative value of the accumulated calculated movement amounts exceeds a predetermined threshold and designating the position on the screen to correspond to a current pointing direction of the predetermined input device configured to be positioned outside of an area of a selected on-screen object.

29. An information processing system, comprising:

a display device having at least one screen;

a plurality of input devices including at least one pointing device; and an information processing apparatus having one or more processors and configured to designate a position on a screen based on outputs of a plurality of input devices, the information processing apparatus comprising:

a first position designating unit for designating the position on the screen to correspond to a position of an on-screen object that is selected using a key selection operation of at least one of the plurality of input devices;

a motion information obtaining unit for obtaining motion information that is information about a motion applied to a first input device housing itself including the pointing device;

a movement amount calculating unit for calculating a movement amount of the first input device housing based on the motion information;

an accumulation unit for accumulating the movement amounts calculated by the movements amount calculating unit;

a threshold determining unit for determining whether or not the cumulative value of the accumulation unit exceeds a predetermined threshold; and a second position designating unit for designating a new position on the screen, to correspond to a current pointing direction of the pointing device configured to be positioned outside of an area of the selected on-screen object, at a time when the threshold determining unit determines that the cumulative value of the accumulation unit exceeds the predetermined threshold.

30. An information processing system, comprising:

a display device having at least one screen;

a predetermined input device having a predetermined input device housing; and an information processing apparatus having one or more processors and configured to select one of a plurality of objects displayed on the screen, the information processing apparatus comprising:

a motion information obtaining unit for obtaining motion information that is information about a motion applied to a predetermined input device housing itself used for an operation of selecting the objects;

a movement amount calculating unit for calculating a movement amount of the input device based on the obtained motion information;

an accumulation unit for accumulating the movement amounts calculated by the movements amount calculating unit;

a selection mode switching unit for switching a selection mode based on the motion information, between a pointing selection mode and a key selection mode, the pointing selection mode being a selection mode in which a new position on the screen is configured to be designated, and any of the objects displayed on the screen are configured to be selected by designating a position where the object is displayed, and the key selection mode being a selection mode in which setting of a focused state indicating a selected state is changed among the objects displayed on the screen in a predetermined order, depending on a predetermined key input, wherein the selection mode switching unit switches the selection mode to the pointing selection mode at a time when the cumulative value of the accumulation unit exceeds a predetermined threshold and designating the position on the screen to a current pointing direction of the predetermined input device configured to be positioned outside of an area of a selected on-screen object.

* * * * *